(12) United States Patent
Bayireddi et al.

(10) Patent No.: US 11,995,612 B2
(45) Date of Patent: May 28, 2024

(54) KNOWLEDGE ENGINE USING MACHINE LEARNING AND PREDICTIVE MODELING FOR OPTIMIZING RECRUITMENT MANAGEMENT SYSTEMS

(71) Applicant: Phenom People, Ambler, PA (US)

(72) Inventors: Mahe Bayireddi, Warrington, PA (US); Hari Bayireddy, Warrington, PA (US); Sivanand Akella, Hyderabad (IN); Suresh Babu Devineni, Hyderabad (IN); S. S. S. Venkateswara Rao Alapati, Visakhapatnam (IN); Shivaramakrishna Nyshadham, Hyderabad (IN); Ilya Goldin, Pittsburgh, PA (US)

(73) Assignee: Phenom People, Ambler, PA (US)

(*) Notice: Subject to any disclaimer, the term of this patent is extended or adjusted under 35 U.S.C. 154(b) by 34 days.

(21) Appl. No.: 16/843,805

(22) Filed: Apr. 8, 2020

(65) Prior Publication Data
US 2020/0320483 A1    Oct. 8, 2020

Related U.S. Application Data

(60) Provisional application No. 62/830,680, filed on Apr. 8, 2019.

(51) Int. Cl.
*G06Q 10/1053* (2023.01)
*G06N 20/00* (2019.01)

(52) U.S. Cl.
CPC ......... *G06Q 10/1053* (2013.01); *G06N 20/00* (2019.01)

(58) Field of Classification Search
CPC ............ G06Q 10/1053; G06N 20/00
See application file for complete search history.

(56) References Cited

U.S. PATENT DOCUMENTS 6,385,620 B1    5/2002    Kurzius et al.
8,620,909 B1    12/2013   Rennison
(Continued)

FOREIGN PATENT DOCUMENTS

WO    2015170963 A1    11/2015

OTHER PUBLICATIONS

Gupta, Anika, and Deepak Garg. "Applying data mining techniques in job recommender system for considering candidate job preferences." 2014 International Conference on Advances in Computing, Communications and Informatics (ICACCI). IEEE, 2014. (Year: 2014).*

(Continued)

*Primary Examiner* — Laura Yesildag
*Assistant Examiner* — Corey Russ
(74) *Attorney, Agent, or Firm* — Flaster Greenberg P.C.

(57) ABSTRACT

A system may receive, identify, and/or extract one or more pieces of information (e.g., categories of knowledge) from an input (e.g., a knowledge source, as described herein). The categories of knowledge may include one or more phrase and/or multi-word phrase, which may be referred to as individual pieces of knowledge (e.g., knowledge entities). The system may identify one or more relationships between the categories of knowledge and/or the individual pieces of knowledge. For example, the relationships may be inter and/or intra-categorical relationships. The relationships may be organized to form a hierarchical relationship driven knowledge engine. The knowledge engine may organize the knowledge entities by entity (e.g., operator, company, job posting) and/or contextualize the knowledge entities by domain (e.g., profession, employer, etc.) by, for example, creating one or more knowledge profiles. The knowledge engine may then use these knowledge profile to dynamically respond to informational requests.

16 Claims, 6 Drawing Sheets

(56) References Cited

U.S. PATENT DOCUMENTS

| | | | |
|---|---|---|---|
| 2005/0080656 A1* | 4/2005 | Crow | G06Q 10/1053 705/7.14 |
| 2005/0080657 A1* | 4/2005 | Crow | G06Q 10/10 705/7.14 |
| 2008/0086504 A1* | 4/2008 | Sanders | G06Q 10/06 |
| 2008/0172284 A1* | 7/2008 | Hartmann | G06Q 10/06316 705/7.14 |
| 2010/0161503 A1 | 6/2010 | Foster | |
| 2011/0231329 A1* | 9/2011 | Vianello | G06Q 10/1053 705/321 |
| 2012/0158633 A1 | 6/2012 | Eder | |
| 2013/0290206 A1* | 10/2013 | Desai | G06Q 10/1053 705/321 |
| 2013/0332382 A1* | 12/2013 | LaPasta | G06Q 10/10 705/321 |
| 2014/0032436 A1 | 1/2014 | Patel | |
| 2014/0122355 A1* | 5/2014 | Hardtke | G06Q 10/105 705/321 |
| 2014/0278633 A1* | 9/2014 | Daly | G06Q 10/1053 705/7.14 |
| 2015/0046357 A1* | 2/2015 | Danson | G06Q 10/1053 705/321 |
| 2015/0112881 A1* | 4/2015 | Modugu | G06Q 10/1053 705/321 |
| 2015/0134554 A1* | 5/2015 | Clais | G06Q 10/1053 705/321 |
| 2015/0302355 A1* | 10/2015 | Grubel | G06Q 10/1053 705/321 |
| 2015/0317605 A1* | 11/2015 | Rao | G06Q 10/1053 705/321 |
| 2016/0140568 A1* | 5/2016 | Naser | G06Q 30/018 705/317 |
| 2016/0232160 A1* | 8/2016 | Buhrmann | G06F 40/14 |
| 2016/0379170 A1* | 12/2016 | Pande | G06F 16/285 705/321 |
| 2017/0061382 A1* | 3/2017 | Zhang | G06Q 10/1053 |
| 2017/0109703 A1* | 4/2017 | Elman | H04L 67/306 |
| 2017/0185964 A1* | 6/2017 | Borges | G06Q 10/1053 |
| 2017/0344555 A1* | 11/2017 | Yan | G06F 16/9535 |
| 2018/0232702 A1* | 8/2018 | Dialani | G06Q 10/1053 |
| 2018/0300689 A1 | 10/2018 | Miller et al. | |
| 2018/0308062 A1* | 10/2018 | Quitmeyer | G06Q 10/1053 |
| 2018/0336528 A1* | 11/2018 | Carpenter | G06F 16/3334 |
| 2019/0066054 A1* | 2/2019 | Kenthapadi | G06Q 10/063112 |
| 2019/0087558 A1* | 3/2019 | Mercury | G06F 16/2365 |
| 2019/0197180 A1* | 6/2019 | Jersin | H04L 51/02 |
| 2020/0019595 A1* | 1/2020 | Azua Garcia | G06Q 10/1053 |
| 2021/0294811 A1* | 9/2021 | Buhrmann | G06F 16/24522 |

OTHER PUBLICATIONS

Harris, Christopher G. "Finding the best job applicants for a job posting: a comparison of human resources search strategies." 2017 IEEE International Conference on Data Mining Workshops (ICDMW). IEEE, 2017. (Year: 2017).*

Nimbekar, Rohini, et al. "Automated resume evaluation system using NLP." 2019 International Conference on Advances in Computing, Communication and Control (ICAC3). IEEE, 2019. (Year: 2019).*

* cited by examiner

KNOWLEDGE ENGINE USING MACHINE LEARNING AND PREDICTIVE MODELING FOR OPTIMIZING RECRUITMENT MANAGEMENT SYSTEMS

CROSS-REFERENCE TO RELATED APPLICATIONS

This application claims the benefit of Provisional U.S. Patent Application No. 62/830,680 filed Apr. 8, 2019, which is incorporated herein by reference in its entirety.

BACKGROUND

Systems, such as a human resources (HR) system, are outdated and suffer from many drawbacks. Traditional HR systems routinely receive requests for information. The request may, for example, originate from a candidate looking for particular jobs or from a HR manager looking for potential candidates for a particular job, such as an individual who has applied to the job. However, existing HR management systems only provide relatively high level or superficial data to user requests and lack, for example, the ability to infer information about the user and/or the request itself. As such, the responses provided by existing HR systems are not consistent with expectations of the requesting entity (e.g., HR manager, candidate, etc.).

Further, users of traditional HR systems may actively and/or passively interact with the system. Active interactions may include transmitting a request to the system, transmitting a response to the system, transmitting information to the system and/or otherwise directly interacting with the system. Passive interactions may include any non-active interactions, such as, for example, privately requesting information from the system and/or privately viewing information provided by the system. Traditional HR systems may track and/or aggregate an entity's active interactions and/or may determine additional information about the entity based on the operator's active interactions. However, traditional HR systems are unable to track and/or aggregate an entity's passive interactions. Accordingly, these systems are unable to learn and/or determine any additional and/or supplemental information about the entity based on an entity's passive interactions.

Since these traditional systems are unable to track and/or aggregate an entity's passive interactions with the system, the system is also unable to determine additional and/or supplemental information about the entity beyond the information explicitly provided to the system by the entity. For example, if an entity passively interacts with the system, the system may be unable to determine one or more of the following: the entity's history interacting with system (e.g., how the entity's interactions with the system have changed over time), the entity's preferences for certain types of information (e.g., how to display certain types of information), and/or the entity's characteristic (e.g., a profile of the entity, what the entity commonly requests, what content the entity prefers, etc.).

Certain pieces of information about an entity may be time sensitive and/or may become stale over time. Time sensitive information may only be useful and/or accurate for a certain period of time. After that time has expired, the information may no longer be useful and/or accurate. These traditional HR systems are unable to consider and/or react to time sensitive information, and as such, is prone to providing inaccurate information (e.g., stale information). Further, these traditional HR systems also fail to extract, correlate, and store information about an entity's previous interactions with the system, and as such are unable to optimize future interactions.

SUMMARY

Provided herein are systems and method for providing a knowledge engine that can provide individualized and dynamic responses, particularly in the context of HR management. The system may receive, identify, and/or extract one or more pieces of information (e.g., knowledge entities) from an input (e.g., a knowledge source, as described herein). The information may be classified under one or more types of knowledge (e.g., knowledge categories). The categories of knowledge may include one or more words, groups of words, phrases and/or multi-word phrases, which may be referred to as individual pieces of knowledge (e.g. a knowledge entity). For example, a knowledge entity "Bachelors of Science Degree in Engineering" may be classified under the "Educational Qualifications" knowledge category. The system may identify one or more relationships between the categories of knowledge and/or the individual pieces of knowledge. For example, the relationships may be inter and or/intra-categorical relationships. The relationships may be organized to form a hierarchical relationship driven knowledge engine (e.g., the knowledge engine 102 and/or the knowledge engine 202). The knowledge engine may aggregate and form analytics based on the extracted information, which may be used to respond to operator requests.

The knowledge engine may receive a request, via a network (e.g., via HTTP, HTTPS, mobile device protocols, chat interfaces, and/or the like), from a requesting entity. As described herein, an entity may include an operator, company, domain, etc. For example, the requesting entity may be an operator (e.g., a requesting operator). The request may include an informational request, for example, about another entity or entities (e.g., other operator, such as applicant operators). Applicant operators may include operators that applied to a job posting, for example, listed by the requesting operator's company. The system may retrieve profiles associated with the applicant operators, a profile associated with the job posting, and a profile associated with the company based on the request. In addition to the applicant operators, the system may, for example, determine one or more suggested operators that has not applied to the job posting based on one or more relationships (e.g., a relationship operator). A relationship operator may be determined based on a relationship between a profile associated with the relationship operator (e.g., or suggested operator) and the profiles associated with the applicant operators, the job posting, or the company. The system may send a response, via the network, to the requesting operator based on the request. The response may include identifications of the applicant operators (e.g., that have applied to the job posting) and the relationship operator candidate (e.g., that has not applied to the job posting).

The profiles retrieved by the system (e.g., profiles associated with the relationship operator, the applicant operators, the job posting, and/or the company) may comprise a plurality of knowledge entities. The knowledge entities may be associated with the respective entity. For example: the profile associated with the relationship operator may include knowledge entities associated with the relationship operator, the profile associated with the job posting may include knowledge entities associated with the job posting, the profile associated with the applicant operators may each include knowledge entities associated with the respective applicant operator, etc. Based on the profiles, the knowledge engine may determine a plurality of relationships between the knowledge entities included in the respective profiles. The relationships between the respective knowledge entities may be summaries to form a relationship between the respective knowledge profile. The relationships between the respective knowledge entities and/or the respective profiles may each be associated with a strength, a direction, and/or a type. As a result, the knowledge engine may determine the relationship operator (e.g., an operator has not applied to the job posting) based on the plurality of relationships between respective knowledge entities. For example, the relationship operator may include a relationship between the respective knowledge entities and/or the respective profiles with a strength that is greater than or equal to a threshold (e.g., a relative, variable, and/or absolute threshold).

The knowledge engine may receive a network request from an operator to view a job posting (e.g., a candidate operator). In response to the request, the knowledge engine may retrieve a profile associated with the candidate operator and a profile associated with the job posting. The knowledge engine may determine a relationship between the profile associated with the candidate operator and the profile associated with the job posting. The knowledge engine may determine the strength of the relationship between the profile associated with the candidate and the profile associated with the job posting. For example, the strength may be based on the correlation between the knowledge entities included in the profile associated with the candidate and knowledge entities included in the profile associated with the job posting. The knowledge engine may respond to the candidate operators request, for example, by providing the job posting. The response may also indicate the strength of the relationship between the profile associated with the candidate and the profile associated with the job posting.

The knowledge engine may receive a network request from another candidate operator, for example, to view a job posting associated with a company. The knowledge engine may retrieve a profile associated with the candidate, a profile associated with the job posting, and/or a profile associated with the company (e.g., that created the job posting). The knowledge engine may determine another job posting for the candidate based on the profile retrieved by the knowledge engine. The other job posting may be created by the same company or another company. For example, the knowledge engine may determine the other job posting based on a relationship between a profile associated with the other job posting and one or more of the profiles associated with the candidate operator, the job posting, or the company. The knowledge engine may send a response to the candidate operator based on the network request, and the response may comprise information associated with the requested job posting and the other job posting.

A knowledge engine may create a knowledge graph that may be directed or undirected (e.g., or profile). The knowledge graph may be weighted. The knowledge graph may include one or more sub-graphs for a plurality of entities. For example, a sub-graph may be created for one or more of the following entities: an operator, a company, a job posting, etc. The knowledge engine may receive a data file. The data file may comprise one or more knowledge entities, which may be associated with a certain operator, company, job posting, etc. The knowledge engine may identify and extract the knowledge entities from within the data file. The knowledge entities may comprise a word and/or a group of words. The knowledge engine may convert each of the knowledge entities in a numerical representation, which may correspond to the word or group of words. The knowledge engine may associate each of the knowledge entities with at least one of a plurality of category, for example, based on the numerical representation. For example, the plurality of categories may include: a technical skills category (e.g., competencies, certifications, etc.); a duties category; a roles category; a responsibilities category; a competencies category (e.g., technical, functional, etc.); a job titles category; a publication category; a patents category; an invention category; a portfolios category; a works category (e.g., art works, musical recordings, algorithms, designs, etc.); a location category; a job responsibilities category; a soft skills category; a prior employment category; a job title category; a required skills category (e.g., competencies, etc.); a minimum level of experience required category; an educational qualifications category; a role expectations category; a salary range category; a travel requirements category; a remote work availability flag; a commensurate benefits category and an educational qualification category (e.g., degree, certifications, courses, etc.).

The knowledge engine may determine one or more weighted dependencies (e.g., or relationships) between each of the knowledge entities and their associated category. The knowledge engine may determine weighted dependencies between the knowledge entities associated with the same category. The knowledge engine may determine weighted dependencies between the knowledge entities associated with different categories. The knowledge engine may generate the knowledge graph using the knowledge entities and the weighted dependencies. The categories within a respective knowledge graph generated by the knowledge engine may depend on the entity for which the knowledge graphs is created. For example, the knowledge graph for an operator may include one or more of the following categories: duties category; competencies category; educational qualifications category (e.g., degree, certification, courses, etc.); portfolios category; works category (e.g., art works, musical recordings, algorithms, designs, etc.); location category; and/or a prior employment category. As another example, the knowledge graph generated for a job posting may include one or more of the following categories: the job title category; the required skills category (e.g.; competencies, eta); the level of experience required category; the educational qualifications category; the role expectations category; the salary range category; the location category; the travel requirements category; the remote work availability flag; and/or the commensurate benefit category.

The knowledge engine may receive a request for a list of potential candidate operators that, for example, have applied to a job. The knowledge engine may retrieve a graph (e.g., or profile) associated with the job. The knowledge engine may determine a plurality of candidates for the job based on one or more graphs. For example, the graphs may be associated with one or more of: a plurality of candidate operators and/or the graph associated with the job. The knowledge engine may associate or determine a rank (e.g., or fit) between the plurality of candidate operators and the job. The rank may be determined based on inter and/or intra-categorical phrase level dependencies of a respective candidate operator's graph and the job's graph. The knowledge engine may respond to a request, for example, by sending a list of candidate operators. The list make be ranked, for example, based on the rank determined between the graph associated with a respective candidate operator and the graph associated with the job.

The knowledge engine may receive a network request from an operator. The operator may be defined by a profile, which may be stored and maintained by the knowledge engine. The knowledge engine may retrieve the profile associated with the operator. The knowledge engine may extract a knowledge entity from the request, for example, based on the profile associated with the operator. The knowledge engine may determine, for example, based on the knowledge entity extracted from the request, at least one of: a profile associated with the request, a domain associated with the request, another operator associated with the request, or another knowledge entity associated with the request. The knowledge engine may retrieve one or more related profiles based on the knowledge entity extracted from the request and at least one of: the profile associated with the request, the domain associated with the request, the other operator associated with the request, or the other knowledge entity associated with the request. The knowledge engine may send a network response to the operator based on the profile associated the operator and the one or more related profiles. The knowledge engine may update the profile associated with the operator and the one or more related profiles based on the request and the response.

The knowledge engine may be configured to establish an active interaction with an operator. The knowledge engine may receive a passive interaction from the operator. For example, a passive interaction may not provide the knowledge engine with the ability to verify the identity of the operator. The knowledge engine may send a response to the operator. The response may comprise a request that the operator authenticate an identity of the operator. The knowledge engine may receive confirmation that the identity of the operator is authenticated. For example, the confirmation may be provided by a knowledge source (e.g., Google, Linked In, Facebook, etc.). The knowledge engine may generate a profile for the operator based on the authenticated identity of the operator. The profile may comprise at least one of: a knowledge entity, a relationship, or a domain. The knowledge engine may receive one or more subsequent interactions with the operator. The knowledge engine may associate the one or more subsequent interactions with the operator based on the authenticated identity associated with the operator. The knowledge engine may update the profile for the operator based on the one or more subsequent interactions associated with the operator.

The knowledge engine may receive a passive interaction from an entity, such as an operator. In response to the passive interaction, the knowledge engine may send a response to the operator that comprises a request that the operator authenticate an identity of the operator. The knowledge engine may then receive confirmation that the identity of the operator has been authenticated. The knowledge engine may generate a profile for the operator based on the authenticated identity of the operator. And the profile may include one or more knowledge entities and relationships. The profile may be further contextualized based on a certain domain. After creating the profile(s) for the operator, the knowledge engine may receive one or more subsequent interactions or requests from the operator. And the knowledge engine may associate these subsequent interactions or requests with the operator based on the operator's authenticated identity associated with the operator. The knowledge engine may also updates the profile(s) for the operator based on the operator's one or more subsequent interactions with the knowledge engine.

DETAILED DESCRIPTION

A knowledge engine may comprise relationships between the various components of knowledge (e.g., knowledge entities, knowledge profiles, operators, and/or domains). The relationships may be directed or undirected, and weighted or unweighted. As described herein, the knowledge engine may extract and/or classify the components of knowledge. For example, the classifications may include one or more of the following: technical and/or functional skills; duties, roles, responsibilities, and/or competencies; soft-skills; educational qualifications; and/or job titles. The knowledge engine may embed and/or modify a file to indicate the classification of the various components of knowledge. The knowledge engine may generate relationships between the various components of knowledge, which may be associated with a relationship strength and/or a relationship type. The knowledge engine may remove noise from the file (e.g., remove unnecessary words from the file). The knowledge engine may identify a word and/or other words that neighbor the word. For example, the neighboring words may exist within a context window of words before and/or after the word. The knowledge engine may determine the relationship (e.g., the similarity or co-occurrences) between the word and its neighboring words. The various components of knowledge may be organized by an entity (e.g., operator, company, job posting, etc.). An entity may include a company, a job posting, or an operator. The operator may include an individual or device that interacts with the knowledge engine, such as an individual at a company (e.g., a human resource (HR) manager at the company, another employee of the company, etc.), a candidate for employment, or any other person or device that interacts with the knowledge engine. The various components of knowledge for an entity may be further described by their context (e.g., domain). For example, the components of knowledge for a given entity, such as an operator, may be further described by one or more of the following domains: profession, employer, alma mater, etc.

Figure 1:
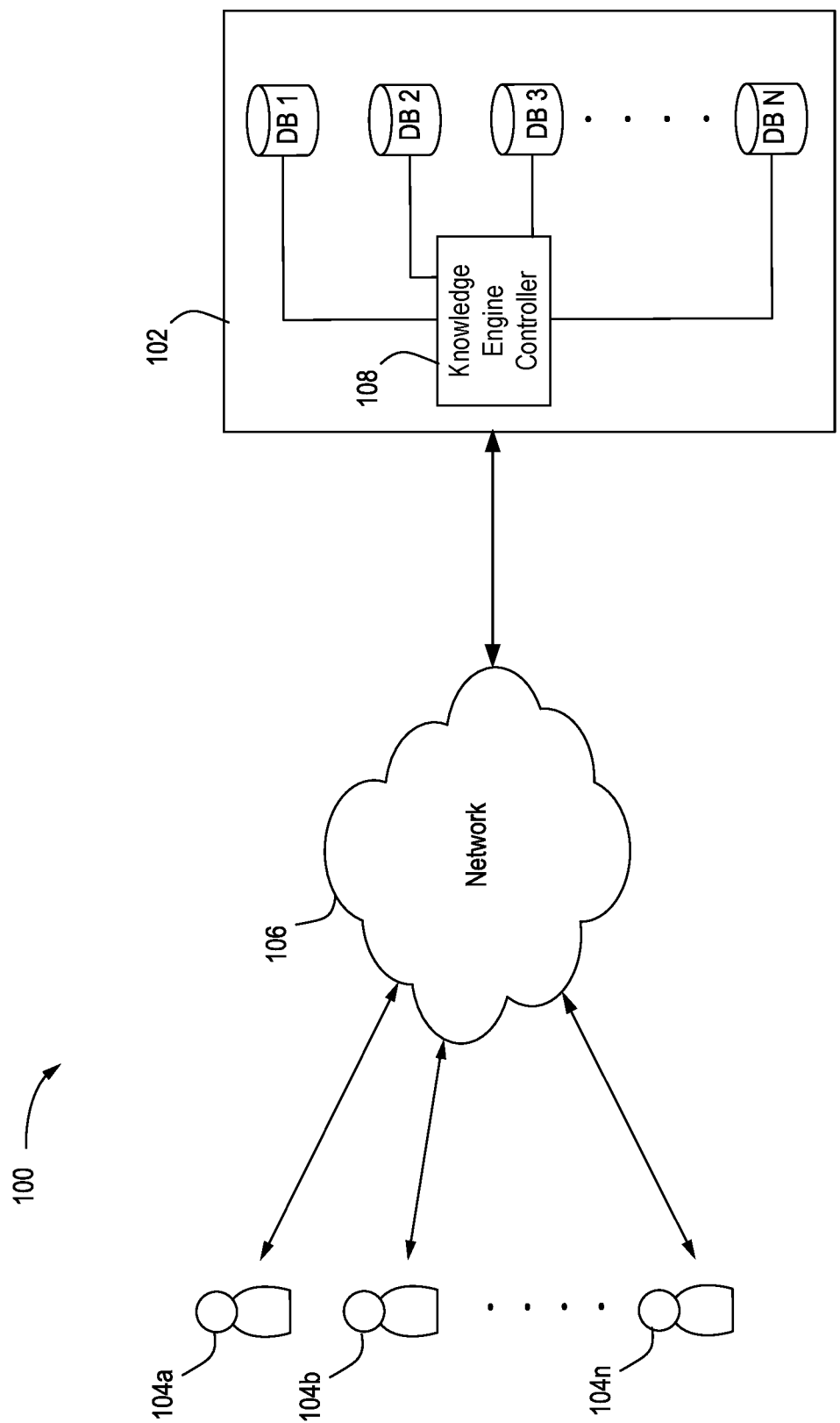
FIG. 1 is a system diagram illustrating an example system in which one or more disclosed embodiments may be implemented.

FIG. 1 is a diagram of a system 100 illustrating an example environment in which one or more of the techniques described herein may be implemented. The system 100 may include one or more knowledge engines, such as the knowledge engine 102. Although illustrated as including a single knowledge engine 102, in some examples, the system 100 may include multiple knowledge engines 102 that may be interconnected and interoperable. The knowledge engine 102 may include a knowledge engine controller 108 and one or more databases DB1 to DBN. The knowledge engine controller 108 may control and/or coordinate the reception of requests, the processing of data, the creation and refinement of knowledge graphs, the creation and transmission of responses, the storage of data, and all other processing and communication of the knowledge engine 102. The knowledge engine controller 108 may include one or more servers, microprocessors or any suitable processing devices, and/or communication circuits. Although described at times in more general terms, the knowledge engine 102 may be configured as a recruitment, human resources (HR), and talent management platform.

One or more entities, such as operators 104a-n, may interact with the knowledge engine 102 via a network 106. Further, although some the examples provided herein are described where the entity is an operator, the examples and techniques described herein are equally applicable to the other types of entities. The operator may include an individual that interacts with the knowledge engine 102, such as an individual at a company (e.g., a human resource (HR) manager at the company, another employee of the company, etc.), a candidate for employment, or any other individual or system that interacts with the knowledge engine 102. The operators 104a-n may interact with the knowledge engine 102 through the network 106. The network 106 may include any combination of public and/or private networks (e.g., the Internet, a cloud network, a local area network (LAN), a private area network (PAN), etc.).

Operators 104a-n may transmit requests to the knowledge engine 102 via the network 106. In one example, the operator may be a HR manager at a company and the request may be a request to see one or more candidates who applied to a job posting. In another example, the operator may be a candidate and the request might be one or more job postings that are applicable to this candidate's search. The knowledge engine 102 may respond to the requests via the network 106. For example, the knowledge engine 102 may response with a list of the one or more candidates who applied to a job posting and/or one or more candidates whose passive interactions may indicate interest in a given job posting. The knowledge engine 102 may receive numerous requests over time from any number and/or combination of operators 104a-n. The response sent by the knowledge engine 102 may be dynamically generated (e.g., based on the specifics of the request) and/or individualized to the operator that transmits the request, for example, using one or more knowledge graphs, as described in more detail herein. The response may provide an operator with information that was not explicitly requested but may, however, be useful to operator, such as a candidate who did not apply to the requested job posting but is otherwise a strong candidate or a job posting that the candidate did not search for but one for which the candidate is a strong candidate. The knowledge engine 102 may provide an operator with information (e.g., time sensitive information) without receiving a specific request for the information from the operator. Further, the knowledge engine 102 may summarize and present the information stored within the knowledge engine 102 in a digestible manner.

The knowledge engine 102 may be configured to respond to one or more requests (e.g., the request transmitted by Operators 104a-n). Referring to FIG. 1, one or more of the following may apply: the knowledge engine 102 may respond to the request transmitted by Operator 104a, the knowledge engine 102 may respond to the request transmitted by Operator 104b, etc. The knowledge engine 102 may dynamically generate (e.g., at the time the request is made) a response to the operator's request using, for example, one or more dynamically updated knowledge graphs associated with the request. The response may be individualized for the respective operator that transmits the request. The response may present a summary of the relevant information stored within the knowledge engine 102. For example, Operators 104a and 104b may transmit the same request to the knowledge engine 102. The response that the knowledge engine 102 sends to Operator 104a may be different than the response that the knowledge engine 102 sends to Operator 104b (e.g., depending on the knowledge extracted by the knowledge engine 102 for Operator 104a and Operator 104b). Similarly, Operator 104a may transmit the same request to the knowledge engine 102 multiple times. Further the response that the knowledge engine 102 sends to Operator 104a may change over time depending on, for example, updates to the knowledge graphs over time.

The knowledge engine 102 may provide individualized responses to a respective entity, such as an operator, by generating and maintaining information or knowledge about the operator (e.g., the operator's characteristics). The information about the operator may be generated and/or maintained based on the operator's interactions with the knowledge engine 102 and/or other systems. The knowledge engine 102 may maintain the operator's knowledge of information, for example, in a knowledge graph (e.g., a sub-graph that is specific to this operator). The sub-graph may be referred to as a knowledge profile. The knowledge engine 102 may employ one or more of the following technologies to generate and/or maintain information about an operator: an event logger and/or event extractor, a supervised machine learning model, an unsupervised machine learning model, a statistical language model, a statistical document and/or topic model, a search engine, a linguistic parser, a mutual information (MI) calculator, and/or a part of speech (POS) tagger. Further, the knowledge engine may improve the information and/or technologies based on the entity's interactions with the knowledge engine 102.

The operators 104a-n may include any person, company, or device that interacts with the knowledge engine 102. For example, an operator may include a person interacting with the knowledge engine 102, another system that interacts with the knowledge engine 102, etc. As described herein, the operator may interact with the knowledge engine 102 by transmitting one or more requests to the knowledge engine 102. The knowledge engine 102 may respond to the operator's request such that the response is specific to the operator (e.g., summarizing the information stored within the knowledge engine 102 that is relevant to the operator and/or the operator's request). For example, an operator may transmit a request to the knowledge engine 102 for a list of other similar operators. Also, or alternatively, an operator may transmit a request for a list of other operators that share one or more characteristics with the requesting operator (e.g., have a relationship with the operator) to the knowledge engine 102. The operator, however, may not provide the knowledge engine 102 with a description of the operator's characteristics. Accordingly, the knowledge engine 102 may generate and/or maintain information (e.g., knowledge) about the operator, which may be based on the operator's requests to the knowledge engine 102 and/or the knowledge engine 102's response. The knowledge engine 102 may use the knowledge about the operator (e.g., stored within the knowledge engine 102) to provide dynamic and individualized responses to the operator's request. The knowledge engine 102 may create knowledge about the operator and/or the operator's characteristics by using knowledge about other operators and/or their characteristics. As described herein, the response may summarize and present the information stored within the knowledge engine 102 that is relevant to the operator and/or the operator's request. For example, the knowledge engine 102 may summarize the information it stores by ranking the information and generating relationship associated with the information.

An entity, such as an operator, may be associated with one or more domains. A domain may be used to describe the context of the entity within the knowledge engine 102. A domain may be used to summarize and present information that is relevant to the entity. For example, if the relevant entity is an operator that is a candidate for a particular job, the operator's domain may describe the operator's profession(s) (e.g., past, present, and/or future professions), fields of interest, employer, alma mater, certifications, education, etc.)

The knowledge engine 102 may use the entity's domain to generate and/or maintain information about the entity, such as a knowledge profile (e.g., a sub-graph) that is specific to the entity (e.g., and which is part of a larger knowledge graph). For example, as described herein, the knowledge engine 102 may use an operator's domain to learn (e.g., extract knowledge) about the operator. For example, the operator may be associated with one domain to describe the operator's present profession, another domain to describe operator's field of interest, and yet another domain to describe the operator's education. As described herein, the knowledge engine 102 may use the operator's domain to extract, generate, and/or organize knowledge about the operator, which for example, may all be included within the knowledge graph associated with the operator and used to process requests that relate to the operator (e.g., requests made directly by the operator and/or requests made by other entities whose request relates to the operator). Similarly, the knowledge engine 102 may use the operator's domain to present and summarize information that is relevant to the operator and/or the operator's request. For example, the knowledge engine 102 may analyze an operator's request to be relevant to one or more of the operator's domains, and the knowledge engine 102 may present the information associated with the relevant domain in response to the operator's request.

The knowledge engine 102 may extract or classify a domain for an entity, such as an operator, based on information about the entity (e.g., an operator's entered educational qualifications). For example, this information about the entity may be determined based on one or more files provided by the entity (e.g., one or more job descriptions), and/or based on an entity's passive interactions with the knowledge engine 102 (e.g., job search history and/or view history).

The knowledge engine 102 may generate and/or update the semantic library based on a plurality of files, documents and/or exemplars associated with the entities that interact with the knowledge engine 102. For example, the knowledge engine 102 may use statistical or natural language processing methods to identify, extract, group, and/or classify individual words or groups of words. These methods may include information associated with the frequency of occurrence and/or co-occurrence of the words or groups of words. Also, or alternatively, the frequencies may be independent of a given domain or conditional on one or more domains.

The knowledge engine 102 may extract, generate, and/or organize information about an entity, such as an operator, using the entity's domain. Referring to an operator, the knowledge engine 102 may extract, generate, and/or organize information about the operator using the operator's domain to, for example, generate and/or update the knowledge graph associated with the operator. The knowledge engine may extract information about the operator using natural language processing (NLP), which may provide a semantic understanding about the operator's information, request, etc. A domain may be associated with one or more words that are semantically similar to each other and/or commonly used within the context of the domain (e.g., a semantic library). The words included in the semantic library may be used to describe operators that are commonly associated with a domain. For example, the semantic library may include one or more terms of art associated with a domain. The semantic library may include the semantic equivalents of a term of art. Also, or alternatively, the semantic library may indicate the definition of the term of art within the context of the domain. The knowledge engine 102 may use the semantic library to extract, generate, and maintain information about an operator. For example, the knowledge engine 102 may search for and extract the words in the semantic library.

As illustrated in FIG. 1, the knowledge engine 102 may comprise a plurality of databases (e.g., DB1 to DBN, as illustrated in FIG. 1). The knowledge engine 102 may maintain (e.g., store and/or periodically update) knowledge (e.g., information, analytics, etc.) about operators and/or domains in the plurality of databases DB1 to DBN, such as the knowledge profiles (e.g., graphs and/or sub-graphs) maintained and updated by the knowledge engine 102. For example, the knowledge maintained by the databases may include relationships shared between the operators and/or domains. Also, or alternatively, the knowledge maintained by the databases may include knowledge entities, which may be associated with an operator and/or a domain. The knowledge entities may include information that the knowledge engine 102 learns (e.g., extracts) about the operator and/or domain over time. The knowledge engine 102 may learn about the knowledge entities based on an operator and/or domains interaction with the knowledge engine 102 and other systems. The databases may include and/or may use any suitable database technology.

The knowledge engine 102 may generate one or more relationships, for example, between knowledge entities, entities, domains, and/or any combination thereof. One or more of the following may apply. The knowledge engine 102 may generate a relationship between a knowledge entity and another knowledge entity, which may indicate that the two knowledge entities are similar and/or connected. For example, the knowledge engine 102 may generate a relationship between two job candidate operators, between a job candidate operator and a company, between a job candidate operator and a job positing, between a job positing and a company, etc. The knowledge engine 102 may generate a relationship between a knowledge entity and an operator (e.g., multiple operators). For example, the knowledge engine 102 may generate a relationship between a name, a date of birth, an email, education, etc. (the knowledge entity) and the candidate operator (e.g., Joe Smith). The knowledge engine 102 may generate a relationship between a knowledge entity and a domain. For example, the knowledge engine 102 may generate a relationship between a particular technical skill (e.g., computer programming) and domain that describes a profession (e.g., software engineer). The knowledge engine 102 may generate a relationship between an operator and a domain. For example, the knowledge engine 102 may generate a relationship between a candidate and the candidates present profession (e.g., Joe Smith and system software developer).

As described herein, the knowledge engine 102 may use knowledge graphs (and the relationships contained therein)

to respond to operator requests, which may include providing information that is relevant but not specifically requested by the operator. A relationship may indicate that two items are similar and/or otherwise connected, which may provide the knowledge engine 102 with the ability to generate additional and/or supplement knowledge about an operator. For example, an operator may indicate to the knowledge engine 102 that the operator is a machine learning engineer. The knowledge engine 102 may extract this knowledge about the operator and assign a "machine learning engineer" knowledge entity to the operator. The knowledge engine 102 may then, based on that information, generate a relationship between the operator and other knowledge entities that may be similar and/or otherwise connected, including, for example, "Deep Learning," "Predictive Modeling," "Java," "Python," etc.

A knowledge graph (e.g., or sub-graphs) may be created in one or more phases. For example, the different phases may use different data sources (e.g., sets of files, documents, and/or information) to: identify knowledge entities, establish relationships between knowledge entities, and/or to modify the respective weights and/or directions of the relationships. A data source may be used in multiple phases of knowledge graph creation. For example, in a first phase, the set of entities and/or relationships may be identified, extracted, and/or classified in a data source that is created or curated by a human. And in a second phase, the set of entities and/or relationships may be modified based on a second data source. Statistical, probabilistic, and/or natural language processing methods may be used to identify entities and/or relationships that are similar (e.g., identical or likely to be identical across multiple data sources). Some data sources may be designated as preferred or more authoritative than other data sources The knowledge engine 102 may include one or more weighted knowledge profiles, which may be organized to form a knowledge graph. The knowledge graph may sometimes be referred to simply as a graph. The graph may be used for machine learning or predictive modeling. The terms machine learning and predictive modeling may be used interchangeably throughout this disclosure. The knowledge engine 102 may create and update the graph by receiving, identifying, and/or extracting knowledge entities from a data file. For example, the knowledge entities may comprise one or more words that are identified and/or extracted from the data file by the knowledge engine 102 using, for example, NLP. The knowledge engine 102 may classify the knowledge entities within one or more categories. For example, the categories may include skills (e.g., technical skills, functional skills and/or soft skills), responsibilities (e.g., job responsibilities), education, experience (e.g., work experience and/or educational experience), titles (e.g., job titles), and/or location. A relationship may be generated between a knowledge entity and a respective category. A relationship may be determined between a knowledge entity and one or more other knowledge entities. The one or more other knowledge entities may or may not be related to the same category. As described herein, the relationships may be associated with a strength, direction, and/or type.

The knowledge graph (e.g., or knowledge profile) created by the knowledge engine 102 may be directed or undirected. The graph may include one or more sub-graphs (e.g., sometimes referred to as knowledge profiles) from each of the respective entities that interact with the knowledge engine 102. For example, the knowledge engine 102 may create a sub-graph for one or more of the following entities: an operator, a company, a job posting, etc. The knowledge engine 102 may receive a data file that includes one or more knowledge entities, which may be associated with a certain operator, company, job posting, etc. The knowledge engine 102 may identify and extract the knowledge entities from within the data file using, for example, NLP. The knowledge entities may comprise a word and/or a group of words. The knowledge engine 102 may convert each of the knowledge entities in a numerical representation, which may correspond to the word or group of words. The knowledge engine 102 may associate each of the knowledge entities with at least one of a plurality of categories, for example, based on the numerical representation. For example, the plurality of categories may include: a technical skills category (e.g., competencies, certifications, etc.); a duties category; a roles category; a responsibilities category; a competencies category (e.g., technical, functional, etc.); a job titles category; a publication category; a patents category; an invention category; a portfolios category; a works category (e.g., art works, musical recordings, algorithms, designs, etc.); a location category; a job responsibilities category; a soft skills category; a prior employment category; a job title category; a required skills category (e.g., competencies, etc.); a minimum level of experience required category; an educational qualifications category; a role expectations category; a salary range category; a travel requirements category; remote work availability flag; a commensurate benefits category and an educational qualification category (e.g., degree, certifications, courses, etc.).

The knowledge engine 102 may determine one or more weighted dependencies (e.g., or relationships) between each of the knowledge entities and their associated category. The knowledge engine 102 may determine weighted dependencies between the knowledge entities associated with the same category or different categories. The knowledge engine 102 may generate the knowledge graph using the knowledge entities and the weighted dependencies. The categories within a respective knowledge graph generated by the knowledge engine 102 may depend on the entity for which the knowledge graphs is created. For example, the knowledge graph for an operator may include one or more of the following categories: duties category; competencies category; educational qualifications category (degree, certification, courses etc.); portfolios category; works category (e.g., art works, musical recordings, algorithms, designs, etc.); location category; and/or a prior employment category. As another example, the knowledge graph generated for a job posting may include one or more of the following categories: the job title category; the required skills category (e.g., competencies, etc.); the level of experience required category; the educational qualifications category; the role expectations category; the salary range category; the location category; the travel requirements category; the remote work availability flag; and/or the commensurate benefit category.

Figure 2:
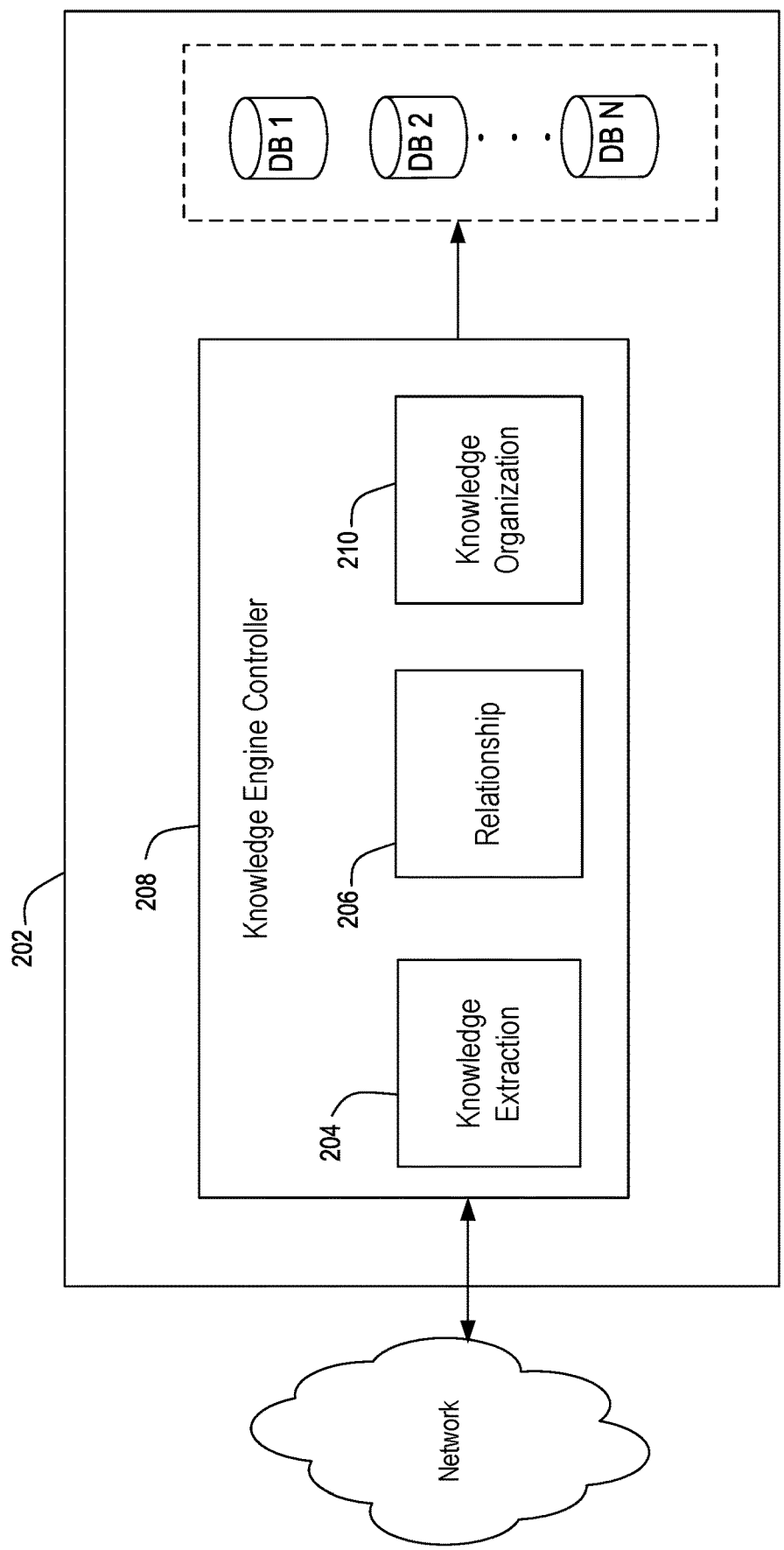
FIG. 2 is a system diagram illustrating a knowledge engine.

FIG. 2 is a diagram illustrating an example knowledge engine 202. The knowledge engine 202 may be an example of the knowledge engine 102 illustrated in FIG. 1. The knowledge engine 202 may include a structured, relationship driven, representation of entities (e.g., operators, companies, job postings, etc.), domains, relationships, and/or knowledge entities. The information may be organized by entity (e.g., operators, companies, job postings, etc.), for example, by generating one or more knowledge profiles for each entity (e.g., sub-graphs). The knowledge profiles may together form a larger knowledge graph (e.g., graph). For example, the knowledge profile for an operator may include one or more knowledge entities associated with the operator, the relationships associated with the operator, and/or the domain(s) associated with the operator. Knowledge entities may include any type of knowledge extracted by the knowledge engine. For example, a knowledge entity may include one or more of the following: a name, a date of birth, an email, education, qualifications, competencies, years of experience, profession, certifications, hobbies, etc.

The information may be organized, for example, by domain by generating a knowledge profile for each domain. A domain may describe the context of the extracted information. For example, a domain may include a profession (e.g., attorney), an employer (e.g., Amazon), an alma mater (e.g., Massachusetts Institute of Technology). A knowledge profile may include one or more knowledge entities associated with the domain, the relationships associated with the domain, and/or the operator(s) associated with domain. Also, or alternatively, a knowledge profile may be generated for each entity/domain combination (e.g., a knowledge profile for operator 1 within the context of a domain for operator 1's employer, and another knowledge profile for operator 1 within the context of a domain for operator 1's profession). Accordingly, an operator's knowledge profile may include the set of knowledge that the knowledge engine 102 associates with an operator. Similarly, a domain's knowledge profile may include the set of knowledge that the knowledge engine 202 associates with a domain.

The knowledge engine 202 may include a knowledge engine controller 208, which may include one or more modules, such as a knowledge extraction module 204, a relationship module 206, and a knowledge organization module 210. The knowledge engine controller 208 may be an example of the knowledge engine controller 108 of FIG. 1. The knowledge engine 202 may also include one or more databases, such as the databases DB1 to DBN, which for example, may be the same as the databases DB1 to DBN illustrated in FIG. 1. The knowledge engine controller 208 may control and coordinate the modules of the knowledge engine 202, store, retrieve, and update knowledge profiles, attributes, etc., receive requests from one or more entities via the network (e.g., network 106), send one or more responses to the entities via the network, and the like.

The knowledge engine 202 may be configured to receive and extract knowledge from an input (e.g., a data file, such as a resume or job posting, a request, etc.), generate relationships based on the knowledge extracted, and/or organize the extracted knowledge and the respective relationships into a knowledge profile, which may be specific to an operator. As described herein, the knowledge engine 202 may maintain the organized information in one or more databases, such as the databases DB1 to DBN. For example, an operator's knowledge profile may be stored in a database and/or across multiple databases. Also, or alternatively, a domain's knowledge profile may be stored in a database and/or across multiple databases.

The knowledge extraction module 204 may be configured to receive and extract knowledge from an input, such as one or more knowledge sources, via the network. Knowledge sources may be repositories of knowledge (e.g., resume banks, company history, news feeds, etc.) and/or ad-hoc inputs of knowledge (e.g., individual resumes, individual biographies, individual job descriptions, etc.). The knowledge sources may include private knowledge sources and/or public knowledge sources. Private knowledge sources may include sources of knowledge that are not publicly accessible (e.g., salary information, benefit information, personally identifying information, etc.). Public knowledge sources may include sources of knowledge that are publicly accessible (e.g., the external services described herein, such as, LinkedIn, Facebook, Google, etc.).

The knowledge engine 202 may refine a knowledge profile over time (e.g., as an operator interacts with the knowledge engine 202 over time). The knowledge engine 202 may continue to extract knowledge, generate relationships, and/or organize knowledge over time. Further, the knowledge engine 202 may perform knowledge extraction, relationship generation, and/or knowledge organization as a perpetually running process (e.g., a perpetually running background process). As a result, an operator's knowledge profile may continue to grow and/or change over time, e.g., as more knowledge becomes available to the knowledge engine 202. The knowledge engine 202 may react to and/or provide information associated with an operator in real time. As described herein, the information provided may summarize the information stored within the knowledge engine 202 that is relevant to the operator. Similarly, the knowledge engine may trigger an alert to an operator based on real time interactions (e.g., the real time interactions of other operators) with the knowledge engine 202.

The knowledge engine 202 may allow active interactions and passive interactions by operators. As described herein, active interaction may allow the knowledge engine 202 to correlate an interaction with an operator based on the operator's identity. Also, or alternatively, passive interactions may not allow the knowledge engine 202 (e.g., or another information system) to correlate an interaction with an operator. For example, passive interaction may include interaction with the knowledge engine 202 in which the operator does not indicate and/or authenticate the operator's identity. The knowledge engine 202 may request that an operator perform active interactions. For example, if the interaction is an active interaction, the knowledge engine 202 may be able to track and maintain the operator's subsequent interactions, which may allow the knowledge engine 202 to determine knowledge (e.g., predictive information, background information, historical information, etc.) about an operator. If the operator performs active interactions, the knowledge engine 202 may track an operator's active interactions with the knowledge engine 202 over time and use that historical information to predict how the operator or other operators (e.g., other operators that are similar or related to the operator) may interact with the knowledge engine 202 in the future.

The knowledge engine 202 may request that an operator authenticate the operator's identity, which may allow the operator's subsequent interactions (e.g., all subsequent interactions) to be active interactions. For example, the knowledge engine 202 may request that an operator authenticate its identity via the knowledge engine 202 or one or more external services (e.g., LinkedIn, Google, Facebook, etc.). If the operator authenticates its identity via an external source, the knowledge engine 202 may request the operator for additional access (e.g., additional read access) to the external service. The knowledge engine 202 may access the external service for additional information about the operator (e.g., may use the external service as a knowledge source on which the knowledge engine 202 may perform knowledge extraction). The knowledge engine 202 may associate and/or group the subsequent interactions of the operator based on the operator's identity. As described herein, an operator's subsequent interactions may be a knowledge source for the knowledge engine 202. Accordingly, the knowledge engine 202 may perform knowledge extraction, relationship generation, and/or knowledge organization based on the operator's subsequent interactions. Further, the results of the knowledge extraction, relationship generation, and/or knowledge organization may be included in the operator's knowledge profile.

An operator may not authenticate their identity (e.g., may not initially authenticate their identity). Even if the operator does not authenticate their identity, the knowledge engine 202 may track the operator's subsequent interactions. For example, the knowledge engine 202 may assign an anonymous identity to the user. The knowledge engine 202 may attach a cookie to the operator's session with the knowledge engine 202. The knowledge engine 202 may track the operator's subsequent interactions based on the assigned anonymous identity, e.g., using the cookie.

The knowledge extraction module 204 may be configured to extract knowledge (e.g., knowledge entities) from a knowledge source using the graph, in conjunction with machine learning, deep learning and/or predictive modeling techniques. Knowledge extraction may be performed, such that the knowledge extracted is based on the knowledge source, the operator and/or the domain. As described herein, knowledge extraction may consider the existence, semantic similarity, absolute or relative location, frequency, co-occurrence, etc. of keywords and/or key phrases included in a knowledge source.

The knowledge extraction module 204 may extract knowledge in one or more categories of knowledge, including, but not limited to, knowledge entities, knowledge profiles, domains, and/or relationships. As described herein, a knowledge entity may refer to an individual piece of extracted knowledge. For example, a knowledge entity may include one or more of the following: a name, a date of birth, an email, education, employer, alma mater, hobbies, etc. A knowledge entity may be public (e.g., visible to other operators within the knowledge system 202) or private (e.g., not visible to other operators within the knowledge system 202).

The knowledge extraction module 204 may extract knowledge from a knowledge source. For example, the knowledge extraction module 204 may search the knowledge source for one or more keywords and/or key phrases (e.g., using NLP), which the knowledge extraction module 204 may then extract from the knowledge source. The knowledge extraction module 204 may extract one or more other words that relate to keywords and/or key phrases (e.g., words that surround and/or are otherwise related to the keywords and/or key phrases). The extracted words may be considered and/or referred to as knowledge entities.

The knowledge extraction module 204 may perform knowledge extraction on a file, which may be received from a knowledge source. The file may include one or more words, which may describe the operator. For example, the words in the file may describe the operator's characteristics, occupation, experiences, skills, education, etc. The knowledge extraction module 204 may search for and extract a keyword and/or key phrase (e.g., a candidate phrase) from the file. For example, a candidate phrase may be determined based on a semantic library (e.g. a semantic library for a domain associated with the operator). The semantic library may include a list of candidate phrases. The semantic library may access machine learning models that classify key words or phrases as belonging to one or more domains or categories. Also, or alternatively, the knowledge extraction module 204 may determine the candidate phrase based on the relative association strength of a pair of words in the file (e.g., using mutual information (MI) or another acceptable measure of association). The knowledge extraction module 204 may classify the words within the candidate phrase (e.g., noun, adjective, verb, etc.). The knowledge extraction module 204 may find the longest sequence of certain words (e.g., nouns and/or adjectives) such that the sequence of words are highly associated (e.g., have a positive MI score). The sequence of words may indicate a skill associated with the operator.

The knowledge extraction module 204 may identify noise within a sequence. The knowledge extraction module may remove any noise from within the sequence. Also, or alternatively, the knowledge extraction module 204 may find a sequence of certain words (e.g., verbs) such that the sequence of words is highly associated (e.g., have a positive MI score). The knowledge extraction module 204 may remove any noise from within the sequence. The sequence of words may indicate a duty, role, responsibility, and/or competency associated with the operator. The knowledge extraction module 204 may extract the sequence and/or candidate phrase. The knowledge extraction module 204 may extract one or more words that surround the candidate phrase and/or sequence. The extracted words may be considered knowledge entities associated with the operator.

Additionally, or alternatively, the knowledge extraction module 204 may be configured to receive and extract knowledge from interactions with the knowledge engine 202. For example, the knowledge extraction module 204 may be configured to receive and extract knowledge from an operator interacting with the knowledge engine 202. Interactions with the knowledge engine 202 may include operator requests, page views (e.g., by an operator), redirect information (e.g., extracted from network header information, such as the redirect URI and/or based on an operator request), geographical location (e.g., extracted from network header information, such as the IP address and/or determined based on an operator request), etc. The knowledge engine 202 may request that an operator verify the operator's identity, which may allow the operators interactions to be active interactions. As described herein, active interactions may include transmitting a request to the knowledge engine 202, transmitting a response to the knowledge engine 202, transmitting information to the knowledge engine 202 and/or otherwise directly interacting with the knowledge engine 202. The knowledge engine 202 may then track and/or associate the operator's interactions with the knowledge engine 202. Further, the techniques described herein to perform knowledge extraction on a file may apply to knowledge extraction on an interaction with the knowledge engine 202.

The relationship module 206 may generate relationships between the various knowledge extracted from the knowledge sources. The relationships may be associated with a direction, a relationship type, and/or a relationship strength. The relationships generated for the knowledge extracted may not be limited to the knowledge source from which the knowledge is extracted. For example, knowledge extracted from a knowledge source may be related to knowledge extracted from another knowledge source. Similarly, relationships may be generated between the knowledge extracted over different operators and/or over different domains.

The relationship module 206 may generate relationships, and the relationships may be associated with a direction. For example, a relationship may be unidirectional or bi-directional. A unidirectional relationship may indicate that the relationship exists in a single direction (e.g., knowledge entity A may be related to knowledge entity B, but knowledge entity B may not be related to knowledge entity A). A bi-directional relationship may indicate that the relationship exists in more than a single direction (e.g., knowledge entity A may be related to knowledge entity B and knowledge entity B may be related to knowledge entity A).

The generated relationships may be associated with a relationship type. The relationship type may be used to indicate the category of the relationship (e.g., a hierarchical relationship, such as, parent or child; an employer-employee relationship; and/or an employer and potential employee relationship, classmates, team members, coworkers, etc.). Also, or alternatively, a relationship may be used to indicate the likelihood that two operators personally know each other or otherwise have mutual connection to other entities. For example, two or more operators may have previously attended the same educational institution (e.g., college) and a relationship may indicate that the operators may personally know each other or mutually know another operator. Similarly, two or more operators may have previously worked for the same company (e.g., were previously co-workers), and a relationship may indicate that the operators may personally know each other.

The relationships may be associated with a relationship strength. The relationship's strength may indicate the correlation between the related pieces of knowledge (e.g., knowledge entities, operators, domains, knowledge profiles, etc.). For example, pieces of knowledge that are highly correlated may be indicated by a higher relationship strength. Pieces of knowledge that are less correlated may be indicated by a lower relationship strength. The relationship module 206 may consider one or more aspects when determining a relationship strength. For example, the relationship module 206 may consider physical relationships (e.g., whether an operator personally knows, or is likely to personally know, another operator).

The knowledge extraction module 204 may extract knowledge from a knowledge source. For example, the knowledge extraction module 204 may extract knowledge from a file (e.g., a job posting, a resume, a biography, a description, etc.) received from the knowledge source. As described herein, the file may comprise data in the form of text. The relationship module 206 may process the text data to generate one or more relationships based on the extracted data. For example, the relationship module 206 may convert the text data to numerical data (e.g., a numerical representation of the text data). The relationship module 206 may employ one or more of the following, which may be implemented using machine learning and/or predictive modeling, to generate relationships for the extracted data. The relationship module 206 may convert the case of the letters within the text data to lowercase. The relationship module 206 may remove stop words from the text data. Stop words may include, for example, words that occur so frequently in natural language that removing the words improves the accuracy and/or reliability of statistical or machine learning models (e.g., articles, pronouns, etc.). The relationship module 206 may convert one or more words to a common base form. For example, the relationship module 206 may convert one or more words to a common base form by using stemming and/or lemmatization.

The relationship module 206 may convert text data into a vector of fixed length (e.g., dense or sparse vectors of fixed length). For example, the keywords or character sequences may be converted to a vector. The vectors may be combined, for example, using a suitable mathematical function, such as averaging, summing, concatenating, etc., either before being passed into a learning model or within a learning model. Also, or alternatively, one or more of the vectors may be combined by passing the vectors into a machine learning model, which may be compared to a one or more other vectors. The length of the vector may be indicated by a parameter, which may be tuned over time and/or based on the text data. The relationship module 206 may determine a statistic to indicate how significant a text data is within the knowledge source. For example, the relationship module 206 may determine a term frequency-inverse document frequency (tf-idf) value for the vector. As a result, the relationship module 206 may determine a vector (e.g., a fixed length vector, such as, 2000) and the vector may be associated with a tf-idf value. The knowledge engine 202 may store the vector using one or more arrays. For example, an array may correspond to the numerical form (e.g., the length of the vector and/or the associated tf-idf value of the text data), and another array may correspond to one or more labels associated with the text data.

The knowledge engine 202 may pass the vectors into one or more leaning models. The knowledge engine 202 may pass other vectors (e.g., generated from other pieces of knowledge) into the learning models. For example, the keywords or character sequence may be converted to a vector. The vector may be combined, for example, using a mathematical function such as averaging, summing, concatenating, etc., either before being passed into a learning model or within a learning model. Also, or alternatively, one or more vectors may be passed into a machine learning model and compared to one or more other vectors. And the machine learning models may determine relationships between the various input vectors. The strength of a relationship between two or more vectors may be proportional to (e.g., equal to) the proximity of the vectors. For example, the proximity of the vectors may be measured using one or more functions (e.g., cosine). The strength of a relationship may be compared to a threshold (e.g., an absolute or relative threshold), and/or may be converted to a rank.

The relationship module 206 may generate relationships using learning models (e.g., one or more predictive modeling, machine learning, and/or deep learning techniques). One or more of the following may apply. A number of clusters may be implemented to be used in associated with the learning models. For example, four clusters may be implemented. The centers of the learning models (e.g., the clusters) may be computed. Multiple iterations of data (e.g., via the inputs, knowledge source, and/or operator interactions to the knowledge engine 202) may be passed through the learning models. The learning models may improve over time, for example, after each integration of data input. For example, the centers of the learning models may align the data with certain clusters (e.g., more accurate clusters). The cluster's centers may be initialized, for example, using k-means. The cluster initialization may include multiple (e.g., twenty) iterations. For example, the cluster centers may be initialized with the weights of the clustering layer. Although certain techniques are described herein with respect to initializing cluster centers, any suitable initialization may be implemented.

The learning models may predict the soft cluster labels q, which may be used as input, for example, to one or more deep encoded vectors. A target distribution p may be computed using for example equation (1):

$$p_{ij} = \frac{q_{ij}^2 / f_j}{\sum_{j'} q_{ij'}^2 / f_{j'}}, \qquad (1)$$

Referring to equation (1), one or more of the following may apply $f_j = \Sigma_i q_{ij}$, and $f_j$ may include soft cluster frequencies A loss may be calculated, for example, using a KL Divergence as illustrated in equation (2):

$$L = KL(P\|Q) = \sum_i \sum_j p_{ij} \log \frac{p_{ij}}{q_{ij}}. \qquad (2)$$

One or more gradients for the loss L may be computed, for example using equation (3):

$$\frac{\partial L}{\partial z_i} = \frac{\alpha + 1}{\alpha} \sum_j \left(1 + \frac{\|z_i - \mu_j\|^2}{\alpha}\right)^{-1} \times (p_{ij} - q_{ij})(z_i - \mu_j), \qquad (3)$$

Referring to equation (3), one or more of the following may apply. $\mu_j$ may include the cluster centroids. $z_i$ may include the data points (e.g., data inputs and/or operator interactions with the knowledge engine 202). The gradients with respect to data points may be passed down, for example, to deep learning networks (e.g., deep nets) and/or may be used for backpropagation. For example, backpropagation may be used to compute the deep learning networks parameter gradients.

The relationship module 206 may generate relationships based on a domain. As described herein, the knowledge engine 202 may determine and maintain (e.g., periodically update) a semantic library for a domain (e.g., each domain). The semantic library may provide an indication of one or more keywords and/or key phrases that are commonly used within the domain. The semantic library may indicate the semantic equivalents (e.g., other keywords and/or key phrases that are synonymous with) of the keywords and/or key phrases. The semantic library may indicate the specialized definition of the keyword and/or key phrase within the domain. The relationship module 206 may use domain's semantic library to generate relationships associated with the operator within the context of a domain. For example, the relationship module 206 may receive a description of an operator's skills via a knowledge source (e.g., a resume, cv, etc.). As described herein, the relationship module 206 may search for and/or trigger on usage of the keywords and key phrases included in the semantic library. The relationship module 206 may generate relationships between the extracted keywords and/or key phrases and synonyms of the keywords and/or key phrases based on the semantic library. As described herein, the keywords and/or key phrases and their synonyms may be stored as knowledge entities within the knowledge engine 202. Further, the knowledge entities may be included on the knowledge profile of one or more operators. Accordingly, the relationship module 206 may generate a relationship between the operators that include the knowledge entities on their profile.

The relationship module 206 may generate relationships based on an operator's interactions with the knowledge engine 202. For example, the relationship module 206 may generate relationships based on an operator's request. As described herein, an operator may send a request to the knowledge engine 202 to view information about another operator and/or domain. The relationship module 206 may generate a relationship between the requesting operator and the other operator and/or domain. Similarly, the relationship module 206 may generate a relationship between the requesting operator and a knowledge entity associated with the other operator and/or domain. If the requesting operator is not otherwise related with another operator, domain, and/or knowledge entity, the relationship may be associated with a unidirectional relationship direction.

The knowledge organization module 210 may be configured to organize the extracted knowledge and the generated relationships. The extracted knowledge may be organized as knowledge entities. Knowledge entities may include indications of the extracted knowledge, the knowledge source, and/or the generated relationships. The knowledge entities may be assigned ownership. For example, a knowledge entity may be owned by an operator and/or a domain. Ownership of a knowledge entity may be assigned based on how the knowledge was extracted. For example, if the knowledge entity is extracted from a knowledge source that is associated with an operator, the knowledge organization module 210 may determine that the knowledge entity is owned by the operator. Also, or alternatively, if the knowledge entity is extracted from a knowledge source associated with a domain, the knowledge organization module 210 may determine that the knowledge entity is owned by the domain.

The knowledge organization module 210 may organize the various components of knowledge associated with an operator (e.g., knowledge entities, relationships, and/or domain) into a knowledge profile. The knowledge profile may indicate the knowledge entities owned by an operator, the relationships associated with an operator, and/or the domains associated with an operator. As a result, the knowledge profile may include the repository of knowledge that the knowledge engine 202 associates with the operator. As described herein, the knowledge engine 202 may maintain and/or update the operator's knowledge profile over time.

Figure 3A:
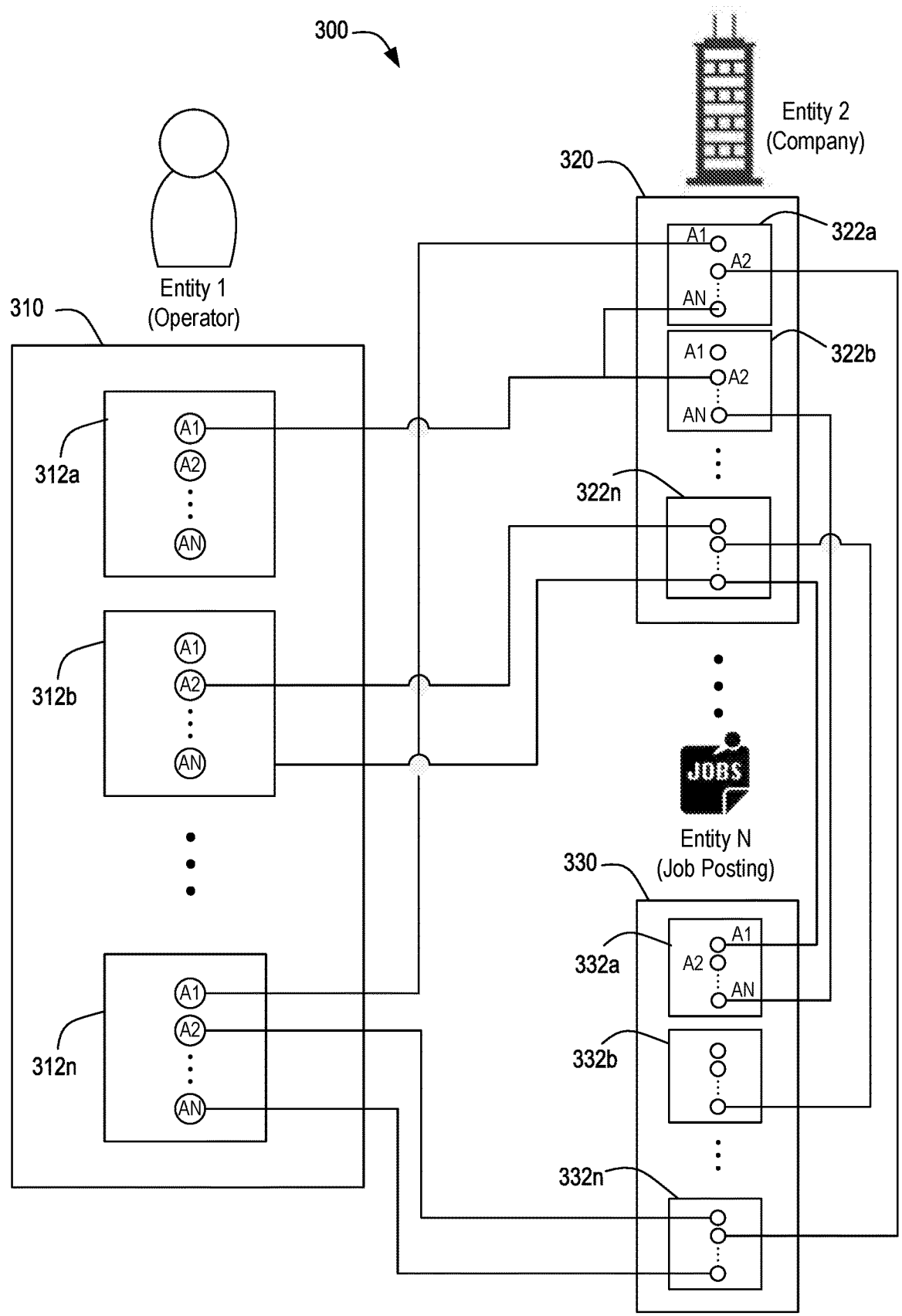
FIG. 3A is a diagram illustrating example relationships between attributes and knowledge entities of various knowledge profiles associated with different entities.

FIG. 3A is a diagram 300 illustrating example relationships between attributes and knowledge entities of various knowledge profiles associated with different entities. The example diagram 300 may not indicate how information is actually stored in a knowledge engine, such as the knowledge engine 102 and/or the knowledge engine 202. Rather, the diagram 300 is an illustration describing an example of how the knowledge engine may conceptualize information. Further, the diagram 300 provides an example illustration of providing and summarizing the information and relationships stored within the knowledge engine that is relevant to the operation and/or the operator's interaction.

The knowledge engine may store and/or maintain a knowledge profile for each entity (e.g., a sub-graph for each operator, company, job posting, etc.) that interacts with the knowledge engine. For example, Entity 1, which may be an operator, may be associated with a knowledge profile 310, Entity 2, which may be a company, may be associated with a knowledge profile 320, and Entity N, which may be a job posting, may be associated with a knowledge profile 330. The knowledge profiles 310, 320, and 330 may include one or more knowledge entities, such as the knowledge entities 312a-n of the knowledge profile 310 for Entity 1, the knowledge entities 322a-n of the knowledge profile 320 for Entity 2, and the knowledge entities 332a-n of the knowledge profile 330 for Entity 3. Each knowledge entity may include multiple attributes. An attribute may include a word or a group of words (e.g., or a numerical representation of the word or groups of words) that are germane to the relevant knowledge entity. For example, an attribute may include the word "attorney" which may describe the entity's profession knowledge entity. The attributes of one knowledge entity may be the same as or different from the attributes of a different knowledge entity, where the knowledge entities may be part of the same or different knowledge profiles. For example, knowledge profile 310 may include attributes A1-AN that are part of knowledge entity 312a, and the attributes A1-AN that are part of knowledge entity 312a may be the same as or different from the attributes A1-AN that are part of the knowledge entity 312b and/or the attributes A1-AN that are part of knowledge entity 322a or 332b.

A knowledge entity and/or attribute may be related to one or more knowledge entities or attributes that are included on the knowledge profile of another entity. The lines connecting the respective knowledge entities may indicate the various relationships. For example, the knowledge engine may derive relationships between an attributes of a knowledge entity of one knowledge graph and an attribute of a knowledge entity of a different knowledge graph, such as between the attribute A1 of knowledge entity 312a and attribute AN of 322a and attribute A2 of knowledge entity 322b. Further, the knowledge engine may create a relationship between an entire knowledge entity of one knowledge graph and a specific attribute of a knowledge entity of another knowledge graph, such as between the knowledge entity 312b and the attribute AN of knowledge entity 322N.

The generated relationships may provide the knowledge engine with the ability to provide information that may be useful, but not explicitly requested. For example, an operator may send a request for information about Entity 1 to the knowledge engine but may not send a request for information about Entity 2 or Entity 3 (e.g., because the requesting operator is unaware of Entity 2 and Entity 3). The knowledge engine may provide the operator with the requested information about Entity 1 based on the knowledge profile 310. Since the knowledge profile 310 of Entity 1 may be related to the knowledge profiles 320, 330 of Entity 2 and Entity N, the knowledge engine may use the knowledge profile 310 to indicate that the requesting operator may also find information about Entity 2 and Entity N useful. The knowledge engine may also provide the requesting operator with information about Entity 2 and Entity N based on Entity 1's relationships with Entity 2 and Entity N, as provided via their respective knowledge profiles 310-330. As a result, the knowledge engine may provide the requesting operator with information that may be useful, but not explicitly requested.

Figure 3B:
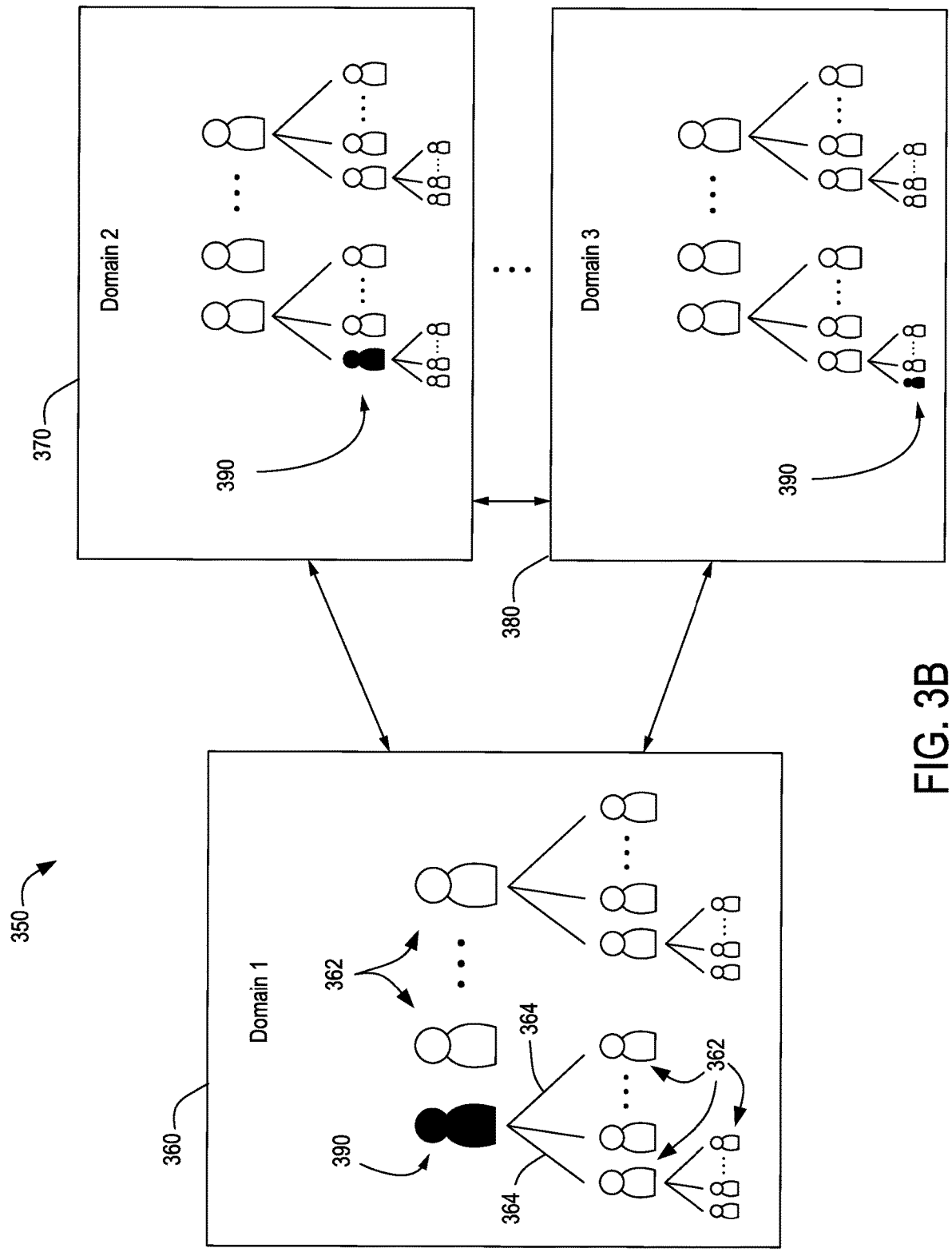
FIG. 3B is a diagram illustrating example relationships between attributes and knowledge entities of various knowledge profiles associated with different domains.

FIG. 3B is a diagram illustrating example relationships between attributes and knowledge entities of various knowledge profiles associated with different domains. The diagram 350 illustrates an example of relationships within a knowledge graph stored by a knowledge engine, such as the knowledge engine 102 and/or the knowledge engine 202. The diagram 350 may not indicate how information is actually stored in the knowledge engine. Rather, the diagram 350 is an illustration describing how the knowledge engine may conceptualize information. Further, the diagram 350 provides an example illustration of how a knowledge engine may provide and summarize the information stored within the knowledge engine that is relevant to the operation and/or the operator's interaction.

As illustrated in the diagram 350, Domain 1 may be associated with a knowledge profile 360, Domain 2 may be associated with a knowledge profile 370, and Domain 3 may be associated with a knowledge profile 380. Domain 1 may describe conceptualize the entities (e.g., operators) within a given employer, such as Google. Domain 2 may describe conceptualize the entities (e.g., operators) within a given profession, such as engineer. Domain 3 may describe conceptualize the entities (e.g., operators) within a given educational institution, such as Harvard University.

The respective knowledge profiles of each domain may include the operators 362 and 390 (e.g., entities) that are related to that domain. Each operator 362 may indicate a different operator/entity. The operator 390 is denoted differently for purposes of illustrating that the same operator may be located with different relationships, hierarchy, and/or organization within the knowledge profiles of different domains. The knowledge profile 360, which is the knowledge profile for Domain 1, may include a plurality of entities, such as the operators 362 and 390 (only a subset of the operators 362 are labeled for purposes of simplicity). Further, the knowledge profile 360 indicates the relationships between the various operators through the use of lines, such as the lines 364 (again, only a subset of the lines 364 are labeled for purposes of simplicity). As such, each knowledge profile 360, 370, 380 for each respective domain, Domains 1-3, may indicate the relationships between the operators that are related to that domain. The respective knowledge profiles may include the specific knowledge entities owned by an operator and related to the domain. For example, a domain's knowledge profile may include a link to the knowledge profile of operators related to the domain.

Further, the knowledge profiles 360, 370, 380 may indicate a hierarchy and/or organization of the operators related to the respective domain. As described herein, the relationships may be associated with a type, strength, and/or directions. For example, within the context of the knowledge profile 360 for Domain 1, operator 390 may be related to one or more children operators (e.g., the related operators below operator 390). Similarly, within the context of Domain 2 and Domain 3, the same operator 390 may be related to one or more parent operators (e.g., the related operators above operator 390).

An operator may be related to a plurality of domains. For example, operator 390 may be related to Domain 1, Domain 2, and Domain 3. As described herein, one or more of the knowledge entities included on operator 390's knowledge profile may also be related to Domain 1, Domain 2, and/or Domain 3. A set of operator 390's knowledge entities may be related to Domain 1, another set of operator 390's knowledge entities may be related to Domain 2, and/or yet another set of operator 390's knowledge entities may be related to Domain 3. The respective sets of operator 390's knowledge entities may or may not overlap. Accordingly, the set of operator 390's knowledge entities related to Domain 1 may not be the same as the set of operator 390's knowledge entities related to Domain 2. Again, although the certain entities are described in FIGS. 3A, 3B, other entities may also be used. For example, as illustrated in the example diagram 300, the knowledge engine may conceptualize other entities under a domain (e.g., companies and/or job posting). That is, the diagrams 300 and 360 illustrate examples of how the knowledge engine may conceptualize information, but are not the only ways that the knowledge engine may conceptualize information.

Figure 4A:
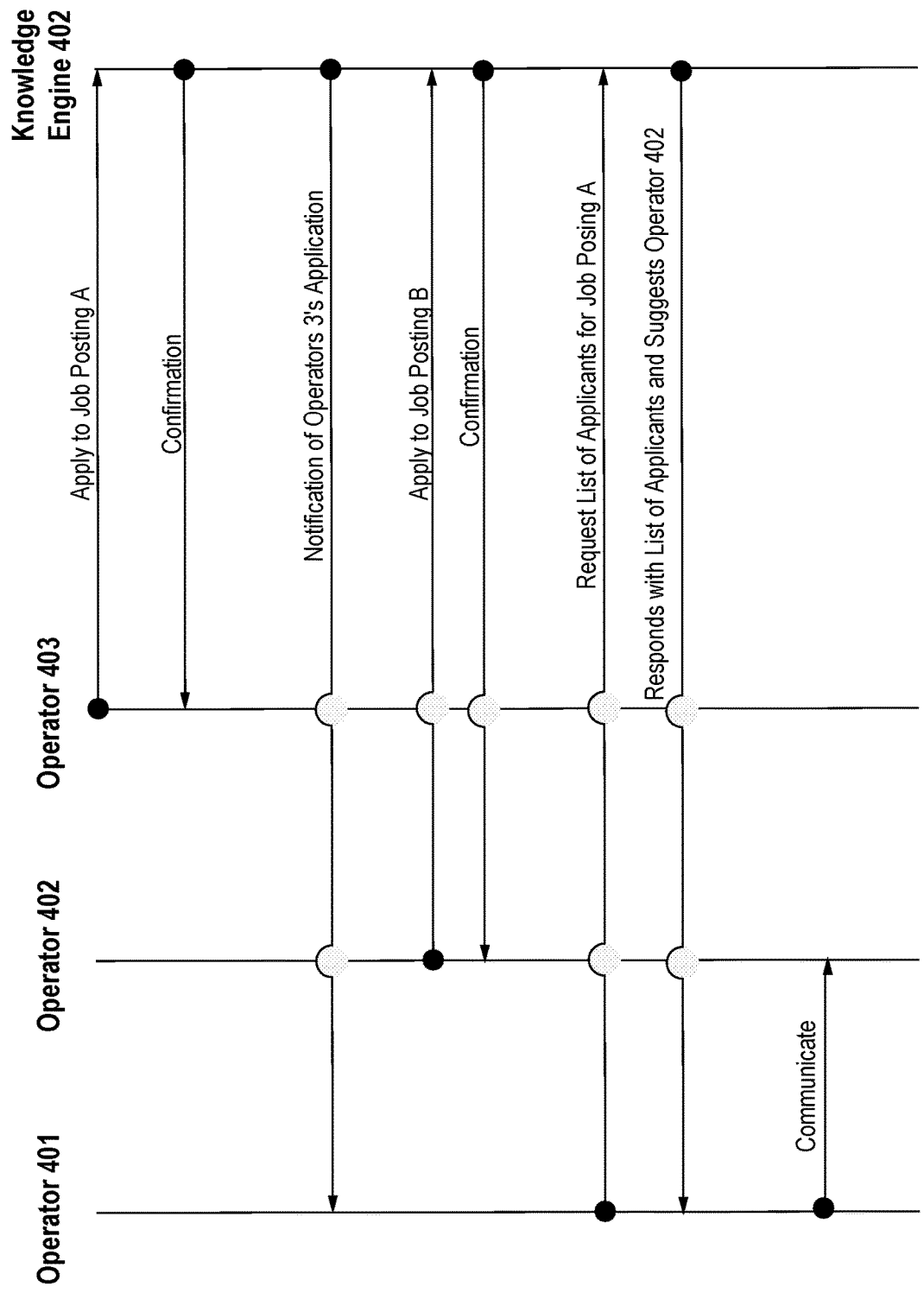
FIG. 4A is an example sequence diagram illustrating a knowledge engine being used to provide individualized responses that are dynamically generated.
Figure 4B:
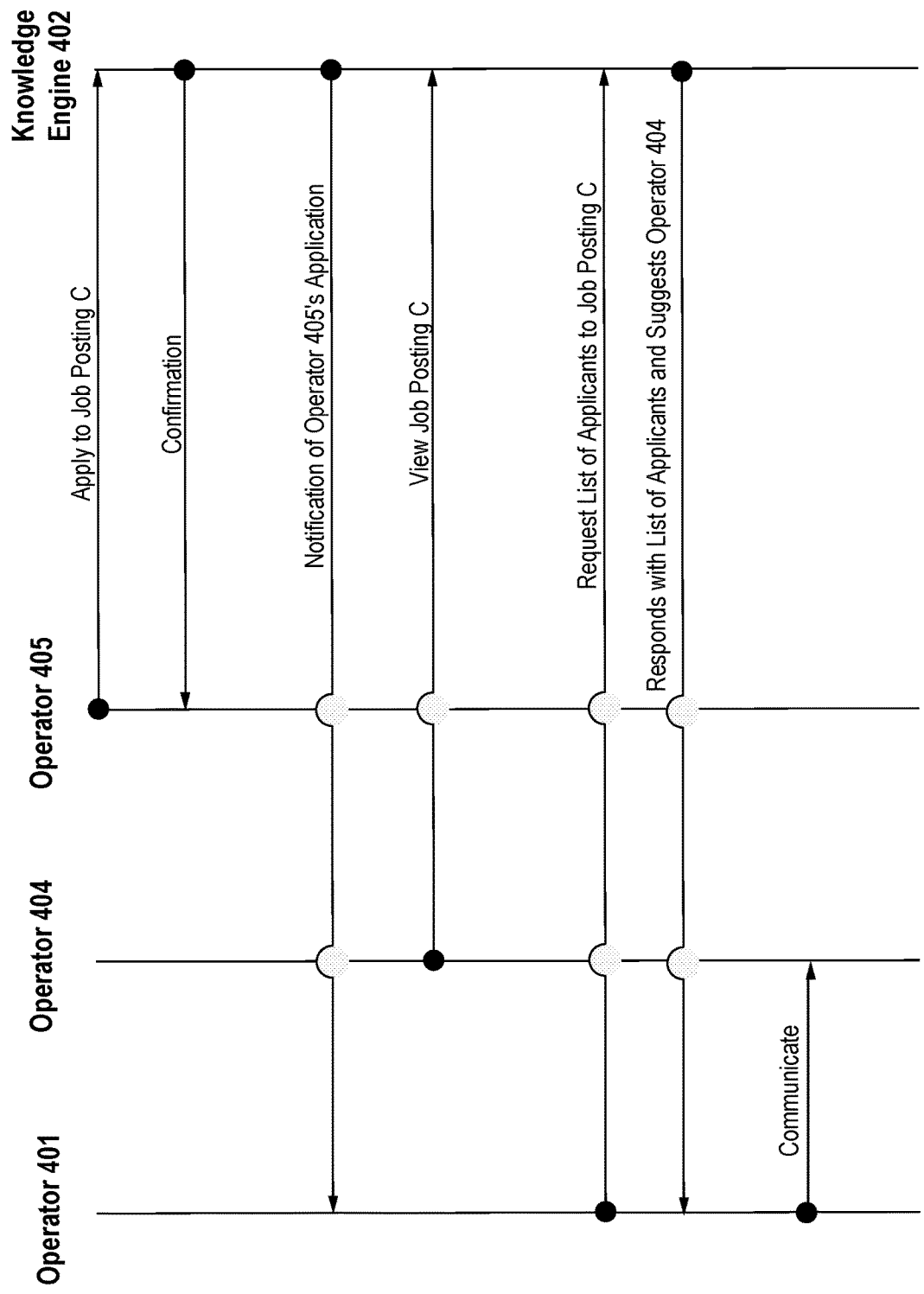
FIG. 4B is another example sequence diagram illustrating a knowledge engine being used to provide individualized responses that are dynamically generated.

FIGS. 4A and 4B are example sequence diagrams illustrating how a knowledge engine 402, which may be an example of the knowledge engine 102, may be used to provide individualized and dynamically generated responses to operator requests. The knowledge engine 402 may be an example of the knowledge engine 102 and/or the knowledge engine 202. As illustrated in FIGS. 4A and 4B, one or more operators may interact with the knowledge engine 402.

Further, the knowledge engine 402 may have previously generated a knowledge profile for the operators using the techniques described herein.

FIG. 4A is an example sequence diagram illustrating operator interactions with the knowledge engine 402 and how the knowledge engine 402 may respond to the operator interactions. As illustrated in FIG. 4A, Operator 401, Operator 402, and Operator 403 may interact with the knowledge engine 402. Operator 401 may be related to a domain to indicate Operator 401's employer and another domain to indicate Operator 401's profession. For example, Operator 401 may be related with the human resources (HR) domain to indicate Operator 401's profession (e.g., Operator 401 is an HR employee for Operator 401's employer). Operator 401 may intend to fill an open position for Operator 401's employer and Operator 401 may generate a job posting, e.g., Job Posting A, for applicants to apply for the open position. Operator 401 may send a request to post Job Posting A to the knowledge engine 402.

The knowledge engine 402 may receive Operator 401's request to post Job Posting A. The knowledge engine 402 may request that Operator 401 authenticate Operator 401's identity (e.g., with an external source). Also, or alternatively, Operator 401 may have previously authenticated its identity and the knowledge engine may associate Operator 401 with the previously authenticated identity. The knowledge engine 402 may generate (e.g., or, if Operator 401 previously interacted with the knowledge engine 402, may have previously generated) a knowledge profile for Operator 401. As described herein, the knowledge engine 402 may generate the knowledge profile for Operator 401 based on the knowledge extracted from the Operator 401's interactions with the knowledge engine 402 and/or one or more knowledge sources (e.g., the external source used to authenticate Operator 401's identity). The knowledge profile for Operator 401 may include one or more knowledge entities, one or more relationships, and/or one or more domains.

The knowledge engine 402 may receive Job Posting A, which, as described herein, may be considered a knowledge source. The knowledge engine 402 may perform knowledge extraction, relationship generation, and knowledge organization for Job Posting A. As a result, the knowledge engine 402 may generate a knowledge profile for Job Posting A. As described herein, the knowledge profile for Job posting A may include one or more knowledge elements, domains, and/or relationships. For example, the knowledge profile for Job posting A may comprise one or more knowledge elements to indicate the requirements, responsibilities, and description of the open position. Further, the knowledge profile for Job posting A may include a relationship with Operator 401 (e.g., the posting HR employee), a domain that indicates the employer associated with the job posting (e.g., Operator 401's domain that indicate Operator 401's employer), and/or a domain that indicates a profession associated with the job posting. The knowledge engine 402 may generate additional relationships based on the knowledge entities, domains, and/or relationships within the knowledge profile for Job Posting A.

As illustrated in FIG. 4A, Operator 403 may interact with the knowledge engine 402 by applying to one or more job postings. As described herein, the knowledge engine 402 may request that Operator 403 authenticate its identity prior to applying to a job posting. The authentication process may allow the knowledge to generate a knowledge profile for Operator 403. As described herein, the knowledge profile may comprise: one or more knowledge entities owned by Operator 403, one or more relationships associated with Operator 402, and/or one or more domains associated with Operator 403. Operator 403 may apply to Job posting A. The knowledge engine 402 may send a confirmation of the application to Operator 403. After Operator 403 applies to Job posting A, the knowledge engine 402 may send a notification of Operator 402's application to Operator 401. As described herein, the knowledge engine may send the notification to Operator 401 based on Operator 401's relationship with Job posting A.

As illustrated in FIG. 4A, Operator 402 may interact with the knowledge engine 402 by applying to one or more job postings. As described herein, the knowledge engine 402 may request that Operator 402 authenticate its identity prior to applying to a job posting. The authentication process may allow the knowledge engine 402 to generate a knowledge profile for Operator 402. As described herein, the knowledge profile may comprise: one or more knowledge entities owned by Operator 402, one or more relationships associated with Operator 402, and/or one or more domains associated with Operator 402. Operator 402 may apply to Job posting B and the knowledge engine 402 may send a confirmation of the Operator 402's application. Job Posting B may be different from Job Posting A. Operator 402 may be unaware of Job Posting A, Operator 401, and/or Operator 403. Further, the knowledge engine 402 may maintain and/or may have previously generated a knowledge profile for Job Posting B. As described herein, Operator 402's application to Job Posting B may be considered a knowledge source and the knowledge engine 402 may perform knowledge extraction, relationship generation, and/or knowledge organization on Operator 402's application. The knowledge engine 402 may generate a relationship between Operator 402 and Job Posting A based on the knowledge extracted from Operator 402's application. For example, the knowledge engine 402 may generate a relationship between Operator 402 and Job Posting A based on one or more of the following: a knowledge entity extracted from Operator 402's application, Operator 402's knowledge profile, Job Posting B's knowledge profile, and/or Job Posting A's knowledge profile.

Operator 401 may interact with knowledge engine 402 in response to a message sent by the knowledge engine 402. For example, Operator 401 may interact with the knowledge engine 402 in response to a notification of Operator 403's application to Job Posting A. Operator 401's interaction may include sending a request for a list of applicants to Job Posting A. As described herein, the knowledge engine 402 may respond to the request from Operator 401. The response may include the list of applicants to Job Posting A. As described herein, the knowledge engine may provide useful, although not explicitly requested, information to a requesting operator. Referring to FIG. 4A, the knowledge engine 402 may indicate to Operator 401 that Operator 402 may be a potential candidate for Job Posting A. Even though Operator 402 may not have applied to Job Posting A, the knowledge engine 402 may determine that providing information about Operator 402 to Operator 401 may be useful based on the relationships generated by the knowledge engine 402. Based on the knowledge engine 402's response, Operator 401 may determine that Operator 402 is a better candidate than Operator 403 for Job Posting A. Accordingly, Operator 401 may communicate with Operator 402, for example, to indicate that Operator 402 should apply to Job Posting A. As described herein, Operator 402 may have been unaware of Job Posting A. Further, as the availability of Job Posting is time sensitive, Operator 402 may have not become aware of Job Posting A prior to Job Posting A becoming filled.

FIG. 4B is an example sequence diagram illustrating operator interactions with the knowledge engine 402 and how the knowledge engine 402 may respond to the respective operator interactions. As illustrated in FIG. 4B, Operator 401, Operator 404, and Operator 405 may interact with the knowledge engine 402. Operator 401 may intend to fill an open position for Operator 401's employer and Operator 401 may generate a job posting, e.g., Job Posting C, for applicants to apply for the open position. Operator 401 may send a request to post Job Posting C to the knowledge engine 402.

The knowledge engine 402 may receive Operator 401's request to post Job Posting C. The knowledge engine 402 may receive Job Posting C, which, as described herein, may be considered a knowledge source. The knowledge engine 402 may perform knowledge extraction, relationship generation, and knowledge organization for Job Posting C. As a result, the knowledge engine 402 may generate a knowledge profile for Job Posting C. As described herein, the knowledge profile for Job posting C may include one or more knowledge elements, domains, and/or relationships. For example, the knowledge profile for Job posting C may comprise one or more knowledge elements to indicate the requirements, responsibilities, and description of the open position. Further, the knowledge profile for Job posting C may include a relationship with Operator 401 (e.g., the posting HR employee), a domain that indicates the employer associated with the job posting (e.g., Operator 401's domain that indicate Operator 401's employer), and/or a domain that indicates a profession associated with the job posting. The knowledge engine 402 may generate additional relationships based on the knowledge entities, domains, and/or relationships within the knowledge profile for Job Posting C.

As illustrated in FIG. 4B, Operator 405 may interact with the knowledge engine 402 by applying to one or more job postings. As described herein, the knowledge engine 402 may request that Operator 405 authenticate its identity prior to applying to a job posting. The authentication process may allow the knowledge to generate a knowledge profile for Operator 405. As described herein, the knowledge profile may comprise: one or more knowledge entities owned by Operator 405, one or more relationships associated with Operator 405, and/or one or more domains associated with Operator 405.

Operator 405 may interact with the knowledge engine 402 by applying to Job posting C. As described herein, Operator 405's interaction with the knowledge engine 402 (e.g., the application to Job Posting C) may be considered a knowledge source and the knowledge engine 402 may perform knowledge extraction, relationship generation, and/or knowledge organization on Operator 405's interaction. For example: the knowledge engine 402 may extract one or more knowledge entities from Operator 405's application to Job Posting C. Similarly, the knowledge engine 402 may generate a relationship between one or more of the following: Operator 405 and Job Posting C, Operator 405 and a domain related to Job Posting C, and/or Operator 405 and another operator related to Job Posting C (e.g., Operator 401).

The knowledge engine 402 may send a confirmation of the application to Operator 405. After Operator 405 applies to Job posting C, the knowledge engine 402 may send a notification of Operator 405's application to Operator 401. As described herein, the knowledge engine may send the notification to Operator 401 based on Operator 401's relationship with Job posting C. Further, the notification may indicate Operator 405 relationship strength with Job Posting C. The notification sent by the knowledge engine 402 may allow Operator 401 to promptly react (e.g., immediately react) to Operator 405's application. For example, the notification sent by the knowledge engine 402 may provide Operator 401 with the ability to determine if Operator 405 is qualified to fill Job Posting C (e.g., based on Operator 405's relationship strength with Job Posting C). Also, or alternatively, the notification sent by the knowledge engine 402 may indicate to Operator 401 to determine other qualified operators to fill Job Posting C.

Operator 404 may interact with the knowledge engine 402 by requesting to view Job Posting C. Although not shown in FIG. 4B, Operator 404 may have previously applied but never considered for Job Posting C. Again, although not shown in FIG. 4B, Operator 404 may have applied to another job posting that was similar to Job Posting C, but failed to be selected for the other job posting. The knowledge engine 402 may request that Operator 404 authenticate its identity. The authentication process may allow the knowledge engine 402 to generate a knowledge profile for Operator 404. As described herein, the knowledge profile may comprise: one or more knowledge entities owned by Operator 404, one or more relationships associated with Operator 404, and/or one or more domains associated with Operator 404. For example, the knowledge engine 402 may generate a relationship between Operator 404 and Operator 401 based on Operator 404 and Operator 401 sharing the same employer (e.g., Operator 401 and Operator 404 are related to the same employer domain). The knowledge engine 402 may generate the relationship between Operator 401 and Operator 404 even if Operator 404 and Operator 401 are unaware of each other (e.g., Operator 401 and Operator 401 do not personally know each other). As described herein, a relationship's strength, type, and/or direction may be used to describe a relationship. For example, the relationship between operators that personally know each other may be stronger than the relationship between operators that do not personally know each other.

Operator 404's interaction with the knowledge engine 402 may be considered a knowledge source and the knowledge engine 402 may perform knowledge extraction, relationship generation, and/or knowledge organization based on Operator 404's interaction. The knowledge engine 402 may update Operator 404's knowledge profile accordingly. For example, the knowledge engine 402 may update Operator 404's knowledge profile to indicate a relationship between Operator 404 and Job Posting C. Similarly, the knowledge engine 402 may update Operator 404's knowledge profile by increasing the relationship strength between Operator 401 and Operator 404 (e.g., based on Operator 401's relationship with Job Posting C).

As illustrated in FIG. 4B, Operator 401 may react to the knowledge engine 402 notification Operator 405's application by requesting for a list of applicants to Job Posting C. The knowledge engine 402 may respond to Operator 401's request by providing the list of applicants to Job Posting C. The response may include an indication of the applicants fit for Job Posting C, which the knowledge engine 402 may determine based on the knowledge profile of each of the respective applicants. As described herein, the knowledge engine 402 may also provide Operator 401 with useful information that was not explicitly requested. For example, the knowledge engine 402 may suggest Operator 404 for Job Posting C. The knowledge engine 402 may suggest Operator 404 based on Operator 404's relationship (e.g., relationship strength) with Job Posting C, Operator 401, and/or Operator 401's employer domain. Further, the knowledge engine 402 may suggest Operator 404 even if Operator 404 does not apply to Job Posting C. The knowledge engine 402 may provide Operator 401 with an indication of Operator 404's fit for Job Posting C, which, as described herein, may be based on Operator 404's knowledge profile (e.g., Operator 404's respective relationships, knowledge entities and/or domains that are relevant to Job Posting C).

Although FIG. 4B illustrates an example where the suggested operator, Operator 404, never applies for the relevant posting (e.g., Job Posting C), other types of operators may also be suggested operators. For example, the suggested operator may be an operator that previously applied to the relevant job posting (e.g., Job Posting C), but for some reason was never considered for the posting (e.g., Job Posting C was removed and/or no longer accepting applications). That is, the figures and examples provided herein do not limit the type of suggested operators determined by the knowledge engine 402 or the scope of the knowledge engine 402. Rather, the figures and examples provided herein are intended to help describe the utility of the knowledge engine 402.

What is claimed is:

1. A method for creating and updating a weighted knowledge graph, the method comprising:
    receiving a request for a potential candidate for a job, wherein the request for the potential candidate is a passive interaction;
    sending a response to the request for the potential candidate for the job based on the request for the potential candidate being the passive interaction, wherein the response comprises a request that an operator associated with the request for the potential candidate for the job authenticate an identity associated with the operator;
    receiving the identity associated with the operator;
    retrieving a weighted knowledge graph associated with the job, wherein the job is associated with an employer;
    retrieving a weighted knowledge graph associated with the employer;
    determining, by a knowledge engine, a plurality of candidates for the job based on a respective weighted knowledge graph associated with each of the plurality of candidates, the weighted knowledge graph associated with the employer, and the knowledge graph associated with the job, wherein the knowledge engine comprises a plurality of clusters, and wherein each of the plurality of clusters is associated with one or more gradients;
    receiving a plurality of data files, each of the plurality of data files comprising knowledge entities relating to each of the plurality of candidates;
    generating vectors associated with each of the plurality of data files;
    associating each of the knowledge entities with at least one of a plurality of categories by passing the vectors associated with each of the plurality of data files to the knowledge engine, wherein the plurality of categories comprises a technical skills category, a job responsibilities category, a soft-skills category, and an educational qualification category, and wherein each of the plurality of categories is associated with a cluster of the plurality of clusters;
    updating, using the knowledge engine, the weighted knowledge graph associated with the job and the weighted knowledge graphs associated with each of the plurality of candidates based on each of the knowledge entities associated with the at least one of the plurality of categories, wherein each of the knowledge entities are further associated with respective weighted relationships, each of the respective weighted relationships being associated with a relationship strength, a relationship type, and a relationship direction, wherein the relationship strength, the relationship type and the relationship direction indicate a likelihood of a personal connection between each of the plurality of candidates and the job;
    determining, by the knowledge engine, a weighted relationship between each of the plurality of candidates and the job based on each of the respective weighted relationships;
    updating the knowledge engine based on the determined weighted relationship between each of the plurality of candidates and the job, wherein updating the knowledge engine comprises updating the one or more gradients associated with each of the plurality of clusters using backpropagation;
    generating, based on the updated knowledge engine, a list of ranked candidates for the job based on the updated weighted knowledge graph associated with the job and the updated weighted knowledge graphs associated with each of the plurality of candidates; and
    sending a second response to the request for the potential candidate for the job, wherein the second response displays the generated list of ranked candidates and an indication of a likelihood of a personal connection between each of the ranked candidates and the job.

2. The method of claim 1, wherein the respective weighted relationships each comprise inter-categorical and intra-categorical relationships between the weighted knowledge graphs associated with the job and the weighted knowledge graphs associated with each of the plurality of candidates, wherein inter-categorical relationships comprise weighted relationships between knowledge entities associated with different categories, and wherein intra-categorical relationships comprise weighted relationships between the knowledge entities associated with a same category.

3. A non-transitory computer-readable medium having stored thereon instructions that, when executed by a control circuit, cause the control circuit to:
    receive a request for a potential candidate for a job, wherein the request for the potential candidate is a passive interaction;
    send a response to the request for the potential candidate for the job based on the request for the potential candidate being the passive interaction, wherein the response comprises a request that an operator associated with the request for the potential candidate for the job authenticate an identity associated with the operator;
    receive the identity associated with the operator;
    retrieve a weighted knowledge graph associated with the job, wherein the job is associated with an employer;
    retrieve a weighted knowledge graph associated with the employer;
    determine, by a knowledge engine, a plurality of candidates for the job based on a respective weighted knowledge graph associated with each of the plurality of candidates, the weighted knowledge graph associated with the employer, and the knowledge graph associated with the job, wherein the knowledge engine comprises a plurality of clusters, and wherein each of the plurality of clusters is associated with one or more gradients;

receive a plurality of data files, each of the plurality of data files comprising knowledge entities relating to each of the plurality of candidates;

generate vectors associated with each of the plurality of data files;

associate each of the knowledge entities with at least one of a plurality of categories by passing the vectors associated with each of the plurality of data files to the knowledge engine, wherein the plurality of categories comprises a technical skills category, a job responsibilities category, a soft-skills category, and an educational qualification category, and wherein each of the plurality of categories is associated with a cluster of the plurality of clusters;

update, using the knowledge engine, the weighted knowledge graph associated with the job and the weighted knowledge graphs associated with each of the plurality of candidates based on each of the knowledge entities associated with the at least one of the plurality of categories, wherein each of the knowledge entities are further associated with respective weighted relationships, each of the respective weighted relationships being associated with a relationship strength, a relationship type, and a relationship direction, wherein the relationship strength, the relationship type and the relationship direction indicate a likelihood of a personal connection between each of the plurality of candidates and the job;

determine, by the knowledge engine, a weighted relationship between each of the plurality of candidates and the job based on each of the respective weighted relationships;

update the knowledge engine based on the determined weighted relationship between each of the plurality of candidates and the job, wherein updating the knowledge engine comprises updating the one or more gradients associated with each of the plurality of clusters using backpropagation;

generate, based on the updated knowledge engine, a list of ranked candidates for the job based on the updated weighted knowledge graph associated with the job and the updated weighted knowledge graphs associated with each of the plurality of candidates, wherein the list of ranked candidates includes a candidate that did not apply for the job; and send a second response to the request for the potential candidate for the job, wherein the second response includes the generated list of ranked candidates, and wherein the second response further includes an indication of whether a respective candidate of the list of ranked candidates applied for the job and an indication of a likelihood of a personal connection between each of the ranked candidates and the job.

4. The non-transitory computer-readable medium of claim 3, wherein the respective weighted relationships each comprise inter-categorical and intra-categorical relationships between the weighted knowledge graphs associated with the job and the weighted knowledge graphs associated with each of the plurality of candidates, wherein inter-categorical relationships comprise weighted relationships between knowledge entities associated with different categories, and wherein intra-categorical relationships comprise weighted relationships between the knowledge entities associated with a same category.

5. The method of claim 1, wherein the response further includes an indication of whether a respective candidate of the list of ranked candidates applied for the job.

6. The method of claim 1, wherein the list of ranked candidates includes a candidate that did not apply for the job.

7. The method of claim 1, further comprising:
determining respective weighted knowledge graphs associated with one or more candidates that did not apply for the job; and
generating the list of ranked candidates for the job based on the respective weighted knowledge graphs associated with each of the one or more candidates that did not apply for the job.

8. The method of claim 1, wherein the method further comprises:
retrieving a weighted knowledge graph associated with the operator, wherein the weighted knowledge graph associated with the operator is retrieved based on the identity associated with the operator, and wherein the weighted relationship between each of the plurality of candidates and the job is further based the weighted knowledge graph associated with the operator.

9. The method of claim 1, wherein each of the weighted knowledge graphs associated with each of the plurality of candidates are associated with a respective domain, wherein the weighted knowledge graph associated with the job is associated with a first domain, and wherein the weighted relationship between each of the plurality of candidates and the job is based on a weighted relationship between the respective domains associated with each of the plurality of candidates and the first domain associated with the job.

10. The non-transitory computer-readable medium of claim 3, wherein the instructions, when executed by the control circuit, further cause the control circuit to:
determine respective weighted knowledge graphs associated with one or more candidates that did not apply for the job; and
generate the list of ranked candidates for the job based on the respective weighted knowledge graphs associated with each of the one or more candidates that did not apply for the job.

11. The non-transitory computer-readable medium of claim 3, wherein the instructions, when executed by the control circuit, further cause the control circuit to:
retrieve a weighted knowledge graph associated with the operator, wherein the weighted knowledge graph associated with the operator is retrieved based on the identity associated with the operator, and wherein the weighted relationship between each of the plurality of candidates and the job is further based the weighted knowledge graph associated with the operator.

12. The non-transitory computer-readable medium of claim 3, wherein each of the weighted knowledge graphs associated with each of the plurality of candidates are associated with a respective domain, wherein the weighted knowledge graph associated with the job is associated with a first domain, and wherein the weighted relationship between each of the plurality of candidates and the job is based on a weighted relationship between the respective domains associated with each of the plurality of candidates and the first domain associated with the job.

13. A device for creating and updated weighted knowledge graphs, the device comprising a processor and a memory, the processor and the memory configured to:
receive a request for a potential candidate for a job, wherein the request for the potential candidate is a passive interaction;
send a response to the request for the potential candidate for the job based on the request for the potential candidate being the passive interaction, wherein the response comprises a request that an operator associated with the request for the potential candidate for the job authenticate an identity associated with the operator;

receive the identity associated with the operator retrieve a weighted knowledge graph associated with the job, wherein the job is associated with an employer;

retrieve a weighted knowledge graph associated with the employer;

determine, by a knowledge engine, a plurality of candidates for the job based on a respective weighted knowledge graph associated with each of the plurality of candidates, the weighted knowledge graph associated with the employer, and the knowledge graph associated with the job, wherein the knowledge engine comprises a plurality of clusters, and wherein each of the plurality of clusters is associated with one or more gradients;

receive a plurality of data files, each of the plurality of data files comprising knowledge entities relating to a candidate of the plurality of candidates;

generate vectors associated with each of the plurality of data files;

associate each of the knowledge entities with at least one of a plurality of categories by passing the vectors associated with each of the plurality of data files to the knowledge engine, wherein the plurality of categories comprises a technical skills category, a job responsibilities category, a soft-skills category, and an educational qualification category, and wherein each of the plurality of categories is associated with a cluster of the plurality of clusters;

update, using the knowledge engine, the weighted knowledge graph associated with the job and the respective weighted knowledge graphs associated with each of the plurality of candidates based on each of the knowledge entities associated with the at least one of the plurality of categories, wherein each of the knowledge entities are further associated with respective weighted relationships, each of the respective weighted relationships being associated with a relationship strength, a relationship type, and a relationship direction, wherein the relationship strength, the relationship type and the relationship direction indicate a likelihood of a personal connection between each of the plurality of candidates and the job;

determine, by the knowledge engine, a weighted relationship between each of the plurality of candidates and the job based on each of the respective weighted relationships;

update the knowledge engine based on the determined weighted relationship between each of the plurality of candidates and the job, wherein updating the knowledge engine comprises updating the one or more gradients associated with each of the plurality of clusters using backpropagation;

generate, based on the updated knowledge engine, a list of ranked candidates for the job based on the determined weighted relationship between each of the plurality of candidates and the job; and send a response to the request for the potential candidate for the job, wherein the response includes the generated list of ranked candidates and an indication of a likelihood of a personal connection between each of the ranked candidates and the job, and wherein the generated list of ranked candidates includes a candidate that did not apply for the job.

14. The device of claim 13, wherein the respective weighted relationships each comprise inter-categorical and intra-categorical relationships between the weighted knowledge graphs associated with the job and the weighted knowledge graphs associated with each of the plurality of candidates, wherein inter-categorical relationships comprise weighted relationships between knowledge entities associated with different categories, and wherein intra-categorical relationships comprise weighted relationships between the knowledge entities associated with a same category.

15. The device of claim 13, wherein the processor and the memory are further configured to:

retrieve a weighted knowledge graph associated with the operator, wherein the weighted knowledge graph associated with the operator is retrieved based on the identity associated with the operator, and wherein the weighted relationship between each of the plurality of candidates and the job is further based the weighted knowledge graph associated with the operator.

16. The device of claim 13, wherein each of the weighted knowledge graphs associated with each of the plurality of candidates are associated with a respective domain, wherein the weighted knowledge graph associated with the job is associated with a first domain, and wherein the weighted relationship between each of the plurality of candidates and the job is based on a weighted relationship between the respective domains associated with each of the plurality of candidates and the first domain associated with the job.

* * * * *